United States Patent
Moridaira

(10) Patent No.: US 9,827,675 B2
(45) Date of Patent: Nov. 28, 2017

(54) COLLISION AVOIDANCE METHOD, CONTROL DEVICE, AND PROGRAM

(71) Applicant: TOYOTA JIDOSHA KABUSHIKI KAISHA, Toyota-shi, Aichi-ken (JP)

(72) Inventor: Tomohisa Moridaira, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 14/953,223

(22) Filed: Nov. 27, 2015

(65) Prior Publication Data

US 2016/0158936 A1    Jun. 9, 2016

(30) Foreign Application Priority Data

Dec. 9, 2014   (JP) ................................. 2014-249269

(51) Int. Cl.
    *B25J 9/16*    (2006.01)
(52) U.S. Cl.
    CPC .......... *B25J 9/1666* (2013.01); *B25J 9/1623* (2013.01); *G05B 2219/39082* (2013.01); *Y10S 901/02* (2013.01)
(58) Field of Classification Search
    CPC ......... B25J 9/1666; G05B 2219/39082; G05B 2219/40492; G05B 2219/40442; G05B 2219/40447; G05B 2219/40476; G05B 2219/40478; G05B 2219/40479; G05B 2219/49137
    See application file for complete search history.

(56) References Cited

U.S. PATENT DOCUMENTS

| | | | | |
|---|---|---|---|---|
| 4,967,126 A | * | 10/1990 | Gretz | B25J 9/1612 318/567 |
| 5,347,459 A | * | 9/1994 | Greenspan | B25J 9/1666 345/424 |
| 5,430,643 A | * | 7/1995 | Seraji | B25J 9/1643 318/568.11 |

(Continued)

FOREIGN PATENT DOCUMENTS

| JP | H09-251308 A | 9/1997 |
|---|---|---|
| JP | H09-314487 A | 12/1997 |

(Continued)

OTHER PUBLICATIONS

Shimizu, Masayuki et al., "Analytical Inverse Kinematics for 7 DOF Redundant Manipulators with Joint Limits," Journal of the Robotics Society of Japan, 2007, vol. 25, No. 4, pp. 606-617.

*Primary Examiner* — Ryan Rink
(74) *Attorney, Agent, or Firm* — Oliff PLC

(57) ABSTRACT

A collision avoidance method according to the present invention avoids collision of a robot arm 120 including an upper arm part 122 and a forearm part 124 connected to each other via an elbow part 134 with an obstacle. Movable areas of the upper arm part 122 and the forearm part 124 in a state in which positions of both ends of the robot arm 120 have been fixed are calculated. Intersections of the movable areas with a first line on a boundary surface of an obstacle area including the obstacle are calculated. A collision avoidance range in which the robot arm 120 does not collide against the obstacle area in the movable areas is determined based on the intersections that have been calculated.

8 Claims, 29 Drawing Sheets

(56) References Cited

U.S. PATENT DOCUMENTS

| | | | | |
|---|---|---|---|---|
| 5,581,166 | A | * 12/1996 | Eismann | B25J 9/04 |
| | | | | 318/568.18 |
| 6,408,224 | B1 | * 6/2002 | Okamoto | B25J 9/1661 |
| | | | | 29/721 |
| 6,526,373 | B1 | * 2/2003 | Barral | B25J 9/1666 |
| | | | | 700/245 |
| 9,333,649 | B1 | * 5/2016 | Bradski | B25J 9/163 |
| 2014/0018959 | A1 | 1/2014 | Matsui | |
| 2014/0316430 | A1 | * 10/2014 | Hourtash | A61B 19/2203 |
| | | | | 606/130 |
| 2017/0028559 | A1 | * 2/2017 | Davidi | B25J 9/1676 |

FOREIGN PATENT DOCUMENTS

| | | | |
|---|---|---|---|
| JP | 2001-287191 | A | 10/2001 |
| JP | 2009-045714 | A | 3/2009 |
| JP | 2010-076058 | A | 4/2010 |
| JP | 2011-093015 | A | 5/2011 |
| JP | 2011-131326 | A | 7/2011 |
| JP | 2012-240144 | A | 12/2012 |

* cited by examiner

COLLISION AVOIDANCE METHOD, CONTROL DEVICE, AND PROGRAM

INCORPORATION BY REFERENCE

This application is based upon and claims the benefit of priority from Japanese patent application No. 2014-249269, filed on Dec. 9, 2014, the disclosure of which is incorporated herein in its entirety by reference.

BACKGROUND OF THE INVENTION

1. Field of the Invention

The present invention relates to a collision avoidance method, a control device, and a program, and specifically relates to a collision avoidance method, a control device, and a program that avoid collision of a robot arm.

2. Description of Related Art

A method of operating a robot arm including a plurality of joints in real time by controlling an operation of the robot arm includes, for example, a master slave method. In the master slave method, a master device (control device) specifies a control value and a slave device (robot arm) operates according to the control value that has been specified. When a hand position of the robot arm is specified as the control value, a joint angle of each joint is calculated using an inverse kinematics calculation.

There is an obstacle such as a torso of a robot around the robot. Therefore, when the robot arm is controlled by specifying the hand position of the robot arm, it is required to not only calculate the joint angle of each joint but also calculate a solution in which the robot arm does not collide against the obstacle such as the torso (collision avoidance solution). When the robot arm is operated in real time, the calculation of the joint angle and the calculation of the collision avoidance solution stated above need to be performed in real time.

Regarding the above technique, Japanese Unexamined Patent Application Publication No. 2011-093015 discloses a control device of a hand-eye bin-picking robot to prevent collision of a hand part of a robot arm with a surrounding environment in consideration of the existence of a hand-eye sensor. The control device disclosed in Japanese Unexamined Patent Application Publication No. 2011-093015 includes table storage means for storing a collision pattern table, moving destination collision determination means for determining whether the hand-eye sensor collides against the robot arm, and posture re-determination means.

The collision pattern table defines combination patterns of the rotation angle in each free axis of the robot arm in which the hand-eye sensor collides against the robot arm. Further, the moving destination collision determination means determines whether the hand-eye sensor collides against the robot arm based on a comparison between the combination patterns of the rotation angles in each of the free axes and the combination patterns defined in the collision pattern table when the robot arm is driven in such a way that an end effector has a posture determined in the position of a workpiece. When it is determined that the hand-eye sensor collides against the robot arm, the posture re-determination means determines a new posture of the end effector suitable for the picking of the workpiece.

SUMMARY OF THE INVENTION

In the technique disclosed in Japanese Unexamined Patent Application Publication No. 2011-093015, the collision pattern table needs to be prepared in advance. It may take an enormous amount of time to prepare this pattern table. Therefore, even when the technique disclosed in Japanese Unexamined Patent Application Publication No. 2011-093015 is employed, it is difficult to calculate the collision avoidance solution in real time.

The present invention has been made in order to solve the aforementioned problem and aims to provide a collision avoidance method, a control device, and a program capable of performing a calculation to avoid collision of a robot arm at a high speed.

A collision avoidance method according to the present invention is a collision avoidance method of a robot arm that avoids collision of the robot arm including a first arm and a second arm connected to each other via a joint part with an obstacle, and the method includes: calculating movable areas of the first arm and the second arm in a state in which positions of both ends of the robot arm have been fixed; calculating intersections of the movable areas with a first line on a boundary surface of an obstacle area including the obstacle; and determining a collision avoidance range in which the robot arm does not collide against the obstacle area in the movable areas based on the intersections that have been calculated.

Further, a control device according to the present invention is a control device that controls a robot arm including a first arm and a second arm connected to each other via a joint part, and the control device includes: movable area calculation means for calculating movable areas of the first arm and the second arm in a state in which positions of both ends of the robot arm have been fixed; intersection calculation means for calculating intersections of the movable areas with a first line on a boundary surface of an obstacle area including an obstacle; and collision avoidance range determination means for determining a collision avoidance range in which the robot arm does not collide against the obstacle area in the movable areas based on the intersections that have been calculated.

Further, a program according to the present invention is a program for achieving a collision avoidance method of a robot arm that avoids collision of the robot arm including a first arm and a second arm connected to each other via a joint part with an obstacle, the program causing a computer to execute the following steps of: calculating movable areas of the first arm and the second arm in a state in which positions of both ends of the robot arm have been fixed; calculating intersections of the movable areas with a first line on a boundary surface of an obstacle area including the obstacle; and determining a collision avoidance range in which the robot arm does not collide against the obstacle area in the movable areas based on the intersections that have been calculated.

According to the configurations stated above, in the present invention, it is possible to determine the collision avoidance range of the robot arm with the simple geometrical method. The present invention is therefore able to perform calculation to avoid collision of the robot arm at a high speed.

Further, preferably, the movable areas are formed of cones having a circle formed by a trajectory obtained by rotating the joint part in a state in which positions of both of the ends of the robot arm have been fixed as a bottom surface and having rotational surfaces formed by trajectories obtained by rotating the first arm and the second arm as cone side surfaces, and the intersection is calculated separately for a first cone formed by the trajectory of the second arm and a second cone formed by the trajectory of the first arm.

Since the calculation is separately performed, a simple calculation method to calculate the intersections of the cones with the line can be simply applied. According to the present invention, it is possible to determine the collision avoidance range of the robot arm much faster.

Further, preferably, when the intersection with the first line is on the bottom surface, a range in which a first range determined based on the first cone and a second range determined based on the second cone overlap with each other is determined as the collision avoidance range of the robot arm.

According to the above configuration, even when the second arm collides against the obstacle at one boundary of the collision avoidance range and the first arm collides against the obstacle at the other boundary, the collision avoidance range can be determined by the simple geometrical method. According to the present invention, it is possible to determine the collision avoidance range of the robot arm much faster.

Further, preferably, the first range is determined based on the intersection on the cone side surface and the intersection on the bottom surface regarding the first cone and the second range is determined based on the intersection on the cone side surface and the intersection on the bottom surface regarding the second cone.

According to the above configuration, it is possible to determine the first range and the second range for each of the first cone and the second cone by the simple geometrical method. According to the present invention, it is possible to determine the collision avoidance range of the robot arm much faster.

Further, preferably, at least a part of the boundary surface of the obstacle area is formed into a curved surface.

When the directions of the boundary surface are discontinuous, the motion of the robot arm may be sharp. In such a case, overspeed or overload may occur in the robot arm. On the other hand, in the present invention, according to the configuration stated above, the amount of change of the motion of the robot arm is reduced. It is therefore possible to suppress overspeed or overload of the robot arm.

Further, preferably, a line that passes a hand position of the robot arm and includes a contact point in a tangent line contacting the curved surface is determined as the first line on the curved surface.

According to the above configuration, even when at least a part of the boundary surface is formed into a curved surface, it is possible to easily determine the collision avoidance range by the simple geometrical method. According to the present invention, it is possible to determine the collision avoidance range of the robot arm much faster even when at least a part of the boundary surface is formed into a curved surface.

According to the present invention, it is possible to provide a collision avoidance method, a control device, and a program capable of performing a calculation to avoid collision of a robot arm at a high speed.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

First Embodiment

Hereinafter, with reference to the drawings, embodiments of the present invention will be described.

Figure 1:
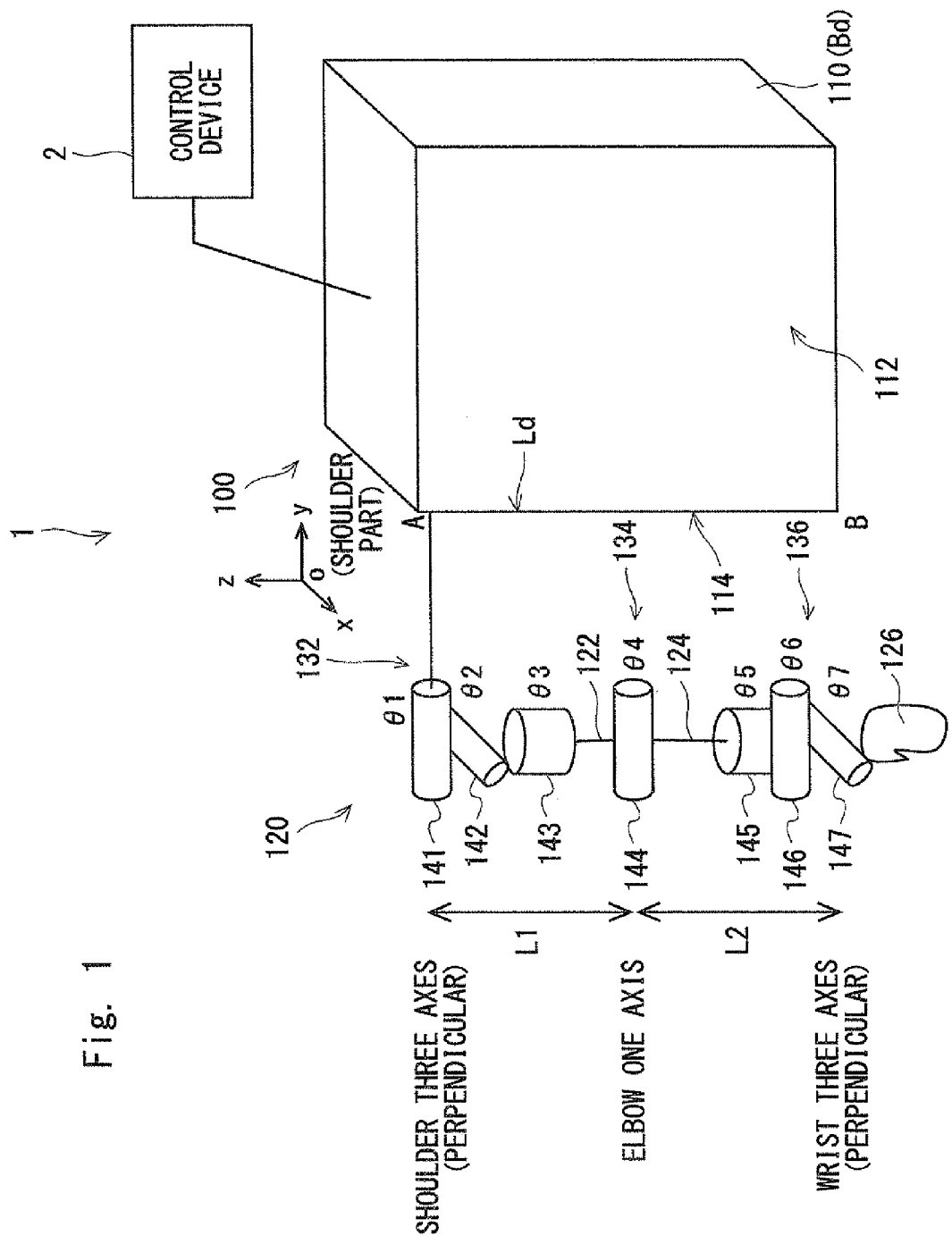
FIG. 1 is a schematic view showing a robot system according to a first embodiment.

FIG. 1 is a schematic view showing a robot system 1 according to a first embodiment. The robot system 1 includes a robot 100 and a control device 2 that controls an operation of the robot. The robot 100 includes a torso 110 and a robot arm 120. The torso 110 includes a torso front surface 112 and a torso side surface 114.

While the actual body (actual torso) of the robot 100 is formed into a shape having a plurality of arbitrary curved surfaces, the torso 110 is schematically considered to be a cuboid Bd that includes the actual torso in this embodiment. Further, in this embodiment, the torso 110 is an obstacle that may collide against the robot arm 120. Therefore, in this embodiment, the torso 110 is an obstacle area including the obstacle (corresponding to the above "cuboid Bd") and the torso front surface 112 and the torso side surface 114 are boundary surfaces of the obstacle area including the obstacle.

The robot arm 120 is connected to the torso side surface 114. While only the robot arm 120 corresponding to the right arm of the robot 100 is shown in FIG. 1, the robot 100 may include the robot arm 120 corresponding to the left arm of the robot 100. Further, the robot 100 may include one or more (e.g., two) legs. While a method of controlling the robot arm 120 corresponding to the right arm of the robot 100 (collision avoidance method) will be described in the following description, the present invention is not limited to this example. The control method according to this embodiment may be applied also to the robot arm corresponding to the left arm of the robot 100 and the leg of the robot 100. That is, the term "arm (robot arm)" includes an arm corresponding to an arm, an arm corresponding to a leg, and an arm of an arm-type robot.

Further, the robot arm 120 includes a shoulder part 132, an upper arm part 122 (first arm), an elbow part 134 (joint part), a forearm part 124 (second arm), a wrist part 136, and a hand part 126 in this order from the one nearest to the torso 110. The shoulder part 132 is connected to the torso 110 (torso side surface 114). Further, the upper arm part 122 and the forearm part 124 are connected to each other via the elbow part 134. Further, the forearm part 124 and the hand part 126 are connected to each other via the wrist part 136. Further, the length of the upper arm part 122 is represented by $L_1$ and the length of the forearm part 124 is represented by $L_2$. In calculations performed in the control device 2 described later, it is assumed that the upper arm part 122 and the forearm part 124 are the line segment having the length $L_1$ and the line segment having the length $L_2$, respectively.

Further, the shoulder part 132 includes three joints (first joint part 141, second joint part 142, and third joint part 143) that rotate around three axes perpendicular to one another. Further, the elbow part 134 includes one joint (fourth joint part 144) that rotates around one axis. Further, the wrist part 136 includes three joints (fifth joint part 145, sixth joint part 146, and seventh joint part 147) that rotate around three axes perpendicular to one another.

Further, the joint angle of the first joint part 141 is represented by $\theta_1$, the joint angle of the second joint part 142 is represented by $\theta_2$, and the joint angle of the third joint part 143 is represented by $\theta_3$. Similarly, the joint angle of the fourth joint part 144 is represented by $\theta_4$, the joint angle of the fifth joint part 145 is represented by $\theta_5$, the joint angle of the sixth joint part 146 is represented by $\theta_6$, and the joint angle of the seventh joint part 147 is represented by $\theta_7$.

In this embodiment, in the calculations in the control device 2 described later, the shoulder part 132 is shown as one point. That is, it is assumed that the first joint part 141, the second joint part 142, and the third joint part 143 intersect with one another at one point. Similarly, in the calculations in the control device 2 described later, the wrist part 136 is shown as one point. That is, it is assumed that the fifth joint part 145, the sixth joint part 146, and the seventh joint part 147 intersect with one another at one point. In this case, it can be said that the three joints of the shoulder part 132 (first joint part 141, second joint part 142, and third joint part 143) and three joints of the wrist part 136 (fifth joint part 145, sixth joint part 146, and seventh joint part 147) each form a virtual spherical structure. Since the robot arm 120 according to this embodiment includes seven joints, it is a manipulator having seven degrees of freedom.

The coordinate system having the shoulder part 132 as an origin O will now be defined. The coordinate axis which passes the origin O and defines the front side (side of the torso front surface 112) direction (from the back side to the front side of the drawing paper of FIG. 1) as positive is represented by an x axis. The coordinate axis which passes the origin O and defines the direction from the right side to the left side of the torso (direction from left to right of FIG. 1) as positive is represented by a y axis. Further, the coordinate axis which passes the origin O and defines the direction in the upper side (upper direction of FIG. 1) as positive is represented by a z axis.

The control device 2 includes a function as a computer, for example. The control device 2 may be included in the robot 100 or may be connected to the robot 100 so that it can communicate with the robot 100 via a wire or wirelessly. The control device 2 controls the operation of the robot 100, especially the operation of the robot arm 120. That is, in the robot system 1, the control device 2 has a function as a master device and the robot 100 (robot arm 120) has a function as a slave device. The control device 2 determines each joint angle of the robot arm 120 to avoid collision of the robot arm 120 with the obstacle such as the torso 110. The details will be described later.

Now, the index "arm angle" used in this embodiment will be described. The index "arm angle" is disclosed in the document "Analytical Inverse Kinematics for 7 DOF Redundant Manipulators with Joint Limits" (Journal of the Robotics Society of Japan, Vol. 25 No. 4, pp. 606 to 617, 2007). In the following description, the "arm angle" will be briefly described.

In general, the position and the posture of the hand of a manipulator in a space may be expressed uniquely by six parameters. Therefore, in seven degrees of freedom manipulator, there is one extra degree of freedom. Due to this redundant degree of freedom, in the seven degrees of freedom manipulator, self-motion having one degree of freedom in a mechanism that does not affect the position and the posture of the hand is possible. As described above, the robot arm 120 according to this embodiment has seven degrees of freedom. Therefore, the robot arm 120 according to this embodiment has one redundant degree of freedom. In this embodiment, the index "arm angle" is used as a parameter to express this redundant degree of freedom.

Figure 2:
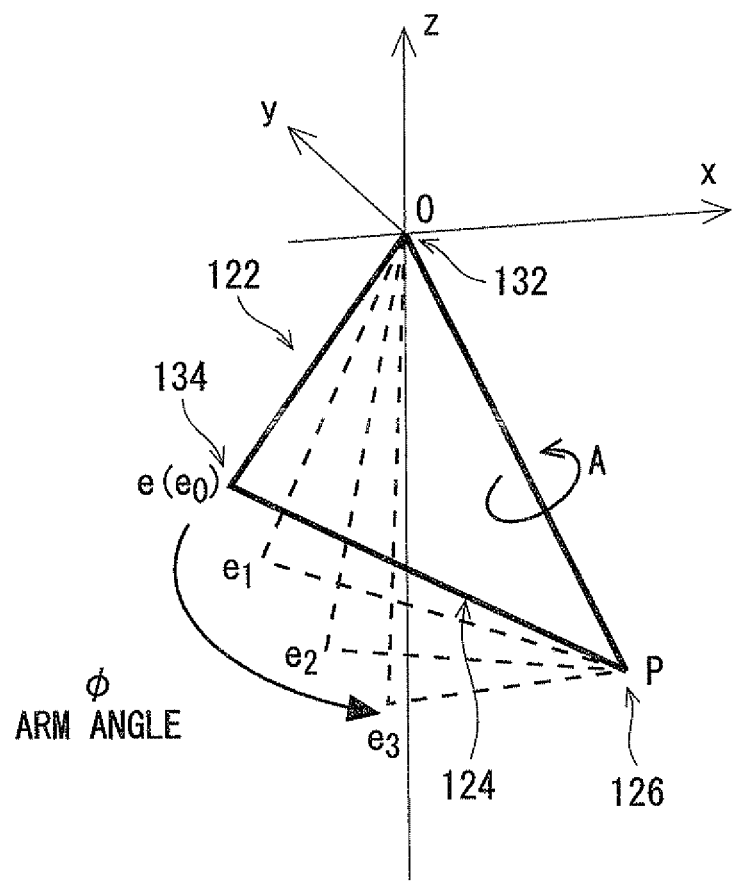
FIG. 2 is a diagram for describing an arm angle according to the first embodiment.

FIG. 2 is a diagram for describing the arm angle according to the first embodiment. As described above, the three joints of the shoulder part 132 and the three joints of the wrist part 136 each form the virtual spherical structure. According to this structure, even when the position and the posture of the hand part 126 are specified and both ends of the robot arm 120 (i.e., the position (point O) of the shoulder part 132 and the position (point P) of the hand part 126) are fixed, the position (point e) of the elbow part 134 may vary due to the redundant degree of freedom. In the following description, the position of the hand part 126 is virtually shown by a point. That is, it is assumed that the position of the wrist part 136 and the position of the hand part 126 are the same with each other.

As shown in FIG. 2, when the position (point P) of the hand part 126 is specified, a triangle O-e-P having apices of the shoulder part 132 (point O), the elbow part 134 (point e), and the hand part 126 (point P) and three sides of the upper arm part 122, the forearm part 124, and the line segment OP is defined. At this time, the triangle O-e-P can be rotated around the line segment OP as shown in the arrow A. In this way, the rotation angle of the position (point e) of the elbow part 134 when the position (point e) of the elbow part 134 is rotated around the line segment OP is represented by an arm angle $\phi$. Further, when the position of the elbow part 134 is on a predetermined reference plane and this position is denoted by a point $e_0$, the arm angle in the triangle O-$e_0$-P is represented by $\phi=0$. The direction in which the point e is rotated clockwise when seeing the point O from the point P (direction of the arrow A) is represented by a positive direction of the arm angle. In other words, the positive direction of the arm angle is defined by the right-hand rule in which the thumb points in the direction of the point O from the point P. When the arm angle $\phi$ is rotated in the positive direction, the position e of the elbow part 134 moves to $e_1$, $e_2$, and $e_3$ from the point $e_0$, where $\phi=0$.

Further, the trajectories drawn by the upper arm part 122 and the forearm part 124 when the position (point e) of the elbow part 134 is rotated around the line segment OP are movable areas of the upper arm part 122 and the forearm part 124, respectively, when the position (point P) of the hand part 126 is specified. The movable areas of the upper arm part 122 and the forearm part 124 are formed by cones (circular cone) having a circle formed by the trajectory obtained by rotating the elbow part 134 as a bottom surface and rotation surfaces formed by the trajectories obtained by rotating the upper arm part 122 and the forearm part 124 as side surfaces.

Figure 3:
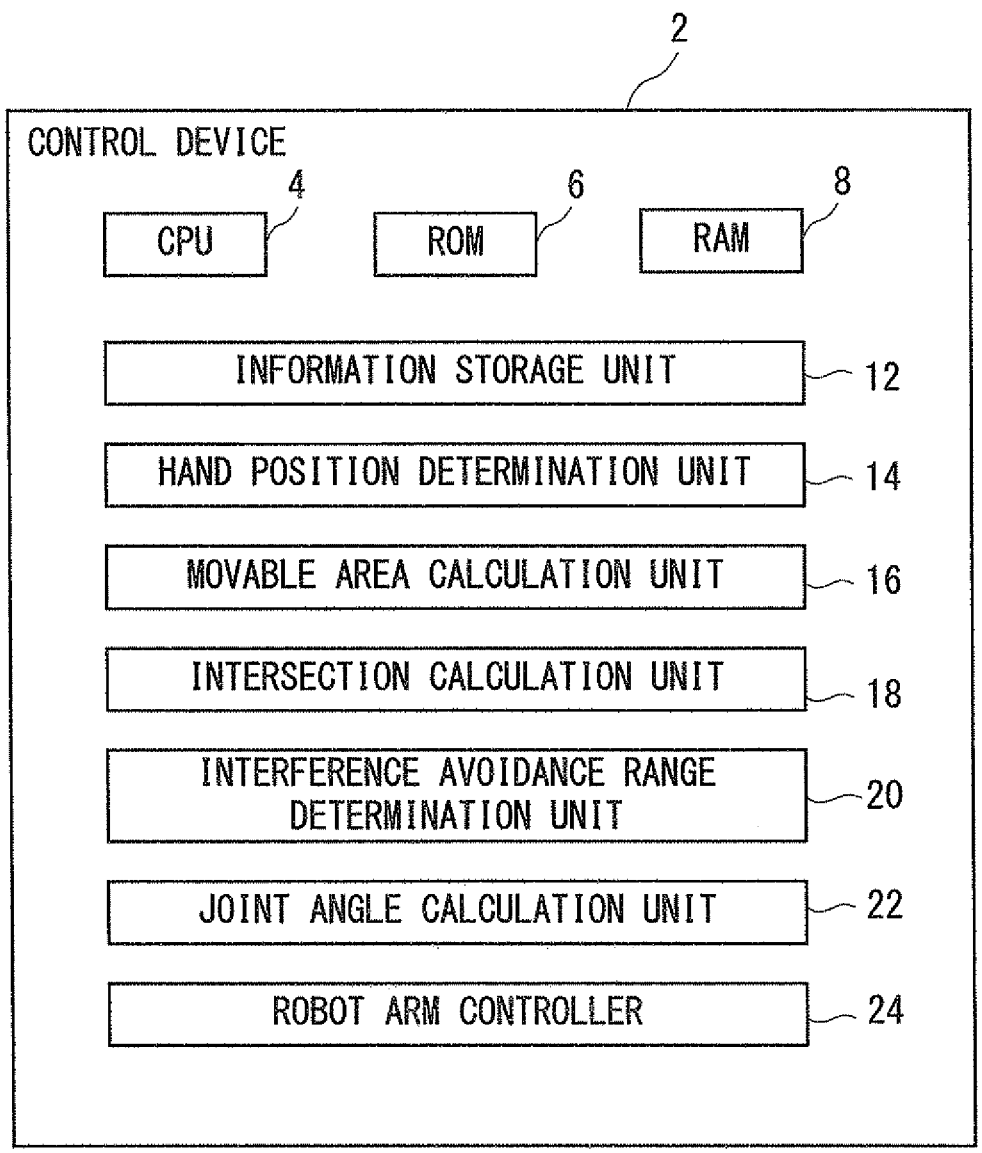
FIG. 3 is a functional block diagram showing a configuration of a control device according to the first embodiment.

FIG. 3 is a functional block diagram showing a configuration of the control device 2 according to the first embodiment. The control device 2 includes, as a main hardware configuration, a Central Processing Unit (CPU) 4, a Read Only Memory (ROM) 6, and a Random Access Memory (RAM) 8. The CPU 4 has a function as a computation device that performs control processing, computation processing and the like. The ROM 6 has a function to store a control program, a computation program and the like executed by the CPU 4. The RAM 8 has a function to temporarily store processing data or the like.

Further, the control device 2 includes an information storage unit 12, a hand position determination unit 14, a movable area calculation unit 16, an intersection calculation unit 18, a collision avoidance range determination unit 20, a joint angle calculation unit 22, and a robot arm controller 24 (hereinafter they are referred to as "each component"). The information storage unit 12, the hand position determination unit 14, the movable area calculation unit 16, the intersection calculation unit 18, the collision avoidance range determination unit 20, the joint angle calculation unit 22, and the robot arm controller 24 include functions as information storage means, hand position determination means, movable area calculation means, intersection calculation means, collision avoidance range determination means, the joint angle calculation means, and robot arm control means. Each component can be achieved by causing the CPU 4 to execute the program stored in the ROM 6, for example. Further, a necessary program may be recorded in an arbitrary non-volatile storage medium (non-transitory computer readable medium) and may be installed as necessary. Each component may not be necessarily implemented by software and may be implemented by hardware such as a circuit element or the like. The function of each component will be described with reference to FIG. 4.

Figure 4:
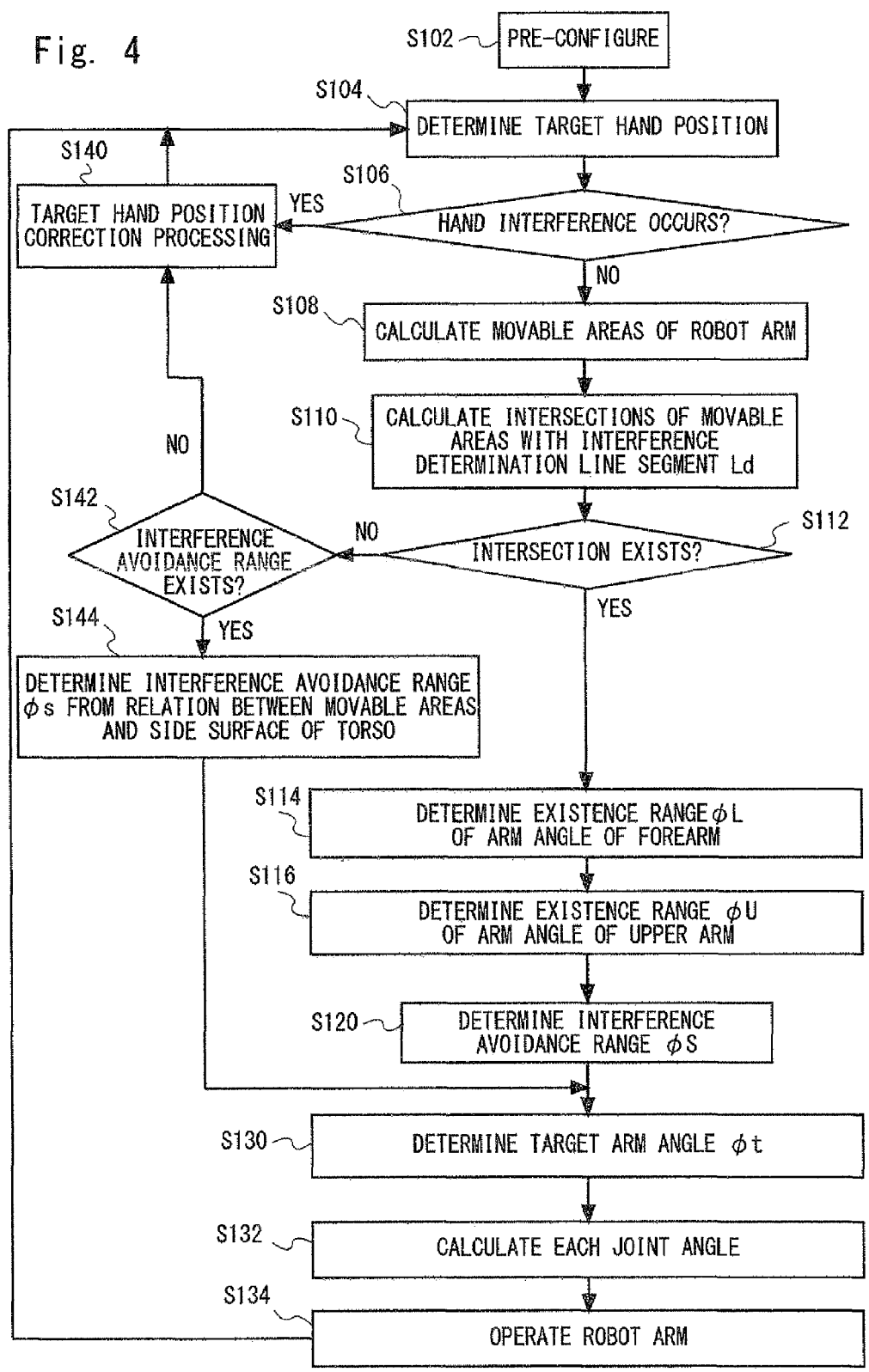
FIG. 4 is a flowchart showing processing of the control device according to the first embodiment.

FIG. 4 is a flowchart showing processing of the control device 2 according to the first embodiment. First, in Step S102, the control device 2 causes the information storage unit 12 to store information necessary to control the robot arm 120 to carry out pre-configuration. The information storage unit 12 stores the length $L_1$ of the upper arm part 122 and the length $L_2$ of the forearm part 124. Further, the information storage unit 12 stores the positional information regarding the torso 110 (obstacle area). Specifically, the information storage unit 12 stores the positional information (coordinate data) of the torso 110 in the xyz coordinate system having the shoulder part 132 as the origin O. Further specifically, the information storage unit 12 stores the positional information (coordinate data) showing the torso front surface 112 and the positional information (coordinate data) showing the torso side surface 114. Further, the information storage unit 12 stores the positional information (coordinate data) indicating the line segment AB shown in FIG. 1. This line segment AB is used as a collision determination line segment Ld (first line) to determine whether to avoid the collision as will be described later.

The coordinate data of the torso 110 stored in the information storage unit 12 has a three-dimensional shape of the obstacle corresponding to the torso 110 used to detect the collision in consideration of the thickness of the actual robot arm 120. Further, the coordinate data of the torso 110 shows the coordinates of the boundary surface of the obstacle area that includes the actual torso 110. That is, the coordinate data of the obstacle area corresponding to the torso 110 includes a margin corresponding to the thickness of the robot arm 120.

Next, in Step S104, the control device 2 determines the position (target hand position) of the hand part 126. Specifically, the hand position determination unit 14 of the control device 2 receives the coordinate data of the target hand position input by an operator using input means such as a keyboard, a mouse, or a haptic device. The position and the posture of the hand part 126 are thus specified.

Next, in Step S106, the control device 2 determines whether collision occurs in the hand part 126. The determination in S106 regarding whether collision occurs is the determination regarding whether the hand part 126 collides against the torso 110. Specifically, the hand position determination unit 14 determines whether the hand part 126 collides against the torso 110 from the target hand position that has been specified. For example, the hand position determination unit 14 may determine whether the hand part 126 collides against the torso 110 by expressing the hand part 126 and the torso 110 by polygons and using an Oriented Bounding Box (OBB).

When the collision of the hand part 126 occurs (YES in S106), the control device 2 performs processing for correcting the target hand position in Step S140. Specifically, the control device 2 cancels the target hand position specified by the processing of S102. The control device 2 then instructs the operator to specify the target hand position again since collision occurs in the target hand position which has been specified by the operator.

On the other hand, when the collision of the hand part 126 does not occur (NO in S106), the control device 2 calculates the movable areas of the robot arm 120 in Step S108. Specifically, the movable area calculation unit 16 of the control device 2 calculates the movable areas of the upper arm part 122 and the forearm part 124 using the arm angle φ described above. The "movable areas" calculated here do not consider the collision of the robot arm 120 with a surrounding obstacle. Hereinafter, the calculation method in the movable area calculation unit 16 will be described.

Figure 5:
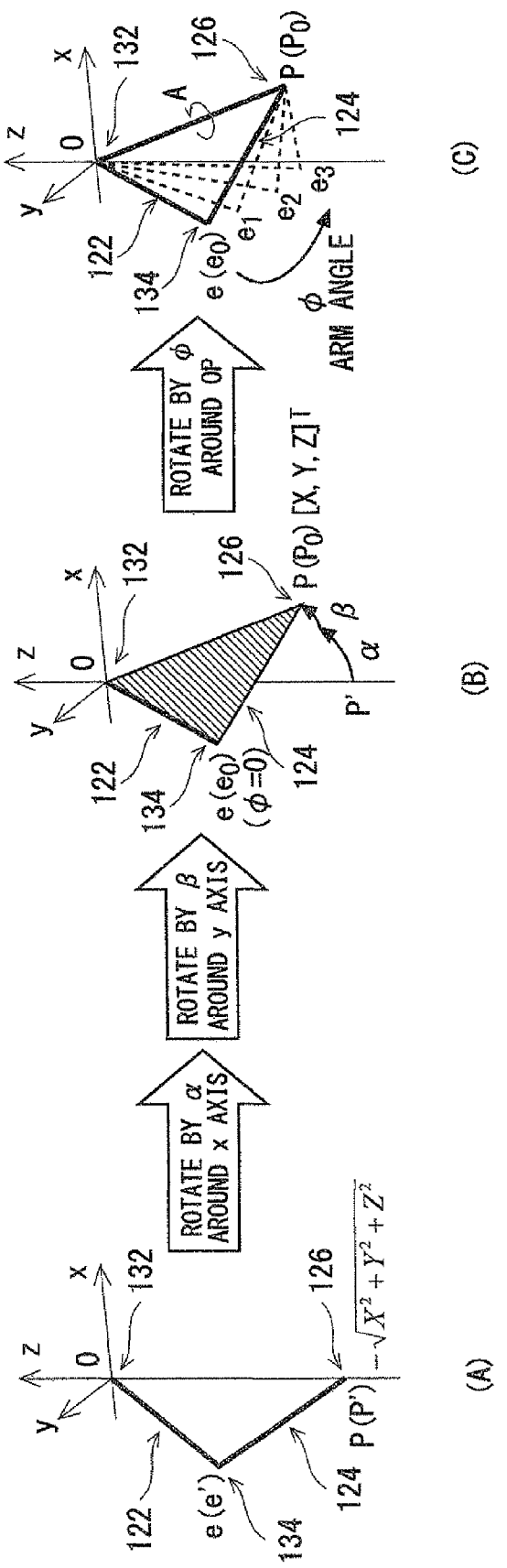
FIG. 5 is a diagram for describing a method of calculating movable areas according to the first embodiment.

FIG. 5 is a diagram for describing the method of calculating the movable areas according to the first embodiment. It is assumed that the position P of the hand part 126 has been specified to be $P_0[X, Y, Z]^T$ in S104. The movable area calculation unit 16 sets the position P of the hand part 126 in the position (point P') in the vertical downward of the z axis while keeping the distance ($\sqrt{(X^2+Y^2+Z^2)}$) between the position (origin O) of the shoulder part 132 and the position P of the hand part 126, as shown in (A) of FIG. 5. At this time, the coordinates of the point P' are $[0, 0, -\sqrt{(X^2+Y^2+Z^2)}]$. Further, the movable area calculation unit 16 sets the position e of the elbow part 134 in the position (e') in the area of x<0 on the xz plane. Therefore, the triangle O-e-P(O-e'-P') having the apices of the shoulder part 132 (point O), the elbow part 134 (point e), and the hand part 126 (point P) exists on the xz plane.

The movable area calculation unit 16 rotates the triangle O-e-P around the x axis by the rotation angle α and around the y axis by the rotation angle β so that the position P of the hand part 126 coincides with the hand position $P_0$ specified by the processing of S104 as shown in (B) of FIG. 5. Specifically, the movable area calculation unit 16 converts the point P' and the point e' into a point $P_0$ and a point $e_0$, respectively, using the following Expressions 1 and 2.

$$P_0 = R_\beta R_\alpha P' \quad \text{(Expression 1)}$$

$$e_0 = R_\beta R_\alpha e' \quad \text{(Expression 2)}$$

In Expressions 1 and 2, P', e', $P_0$, and $e_0$ are position vectors regarding the point P', the point e', the point $P_0$, and the point $e_0$, respectively. Further, $R_\alpha$ indicates the rotation matrix indicating the rotation angle α. Further, $R_\beta$ indicates the rotation matrix indicating the rotation angle β. Further, since the lengths of the links ($L_1$ and $L_2$) of the robot arm 120 are determined in advance, $e_0$ and e' can be calculated and α and β can be uniquely calculated from the above Expressions 1 and 2.

The movable area calculation unit 16 decides the plane including the triangle O-$e_0$-$P_0$ (shown by oblique lines) after the rotation shown in (B) of FIG. 5 as a reference plane that serves as a reference for the arm angle. That is, the movable area calculation unit 16 sets the arm angle to be φ=0 when the position e of the elbow part 134 is in the point $e_0$.

As shown in (C) of FIG. 5, the movable area calculation unit 16 calculates the trajectories obtained by rotating the upper arm part 122 and the forearm part 124 around OP in the direction of the arrow A in a state in which the shoulder part 132 is fixed to the origin O and the hand part 126 is fixed to the point $P_0$. These trajectories are the movable areas of the upper arm part 122 and the forearm part 124 when the position (point P) of the hand part 126 is specified to be the point $P_0$. The movable areas are formed by cones having a circle formed by the trajectory obtained by rotating the elbow part 134 as a bottom surface and the rotation surfaces formed by the trajectories obtained by rotating the upper arm part 122 and the forearm part 124 as side surfaces. In other words, the movable areas of the robot arm 120 are formed by two cones having a common bottom surface.

Figure 6:
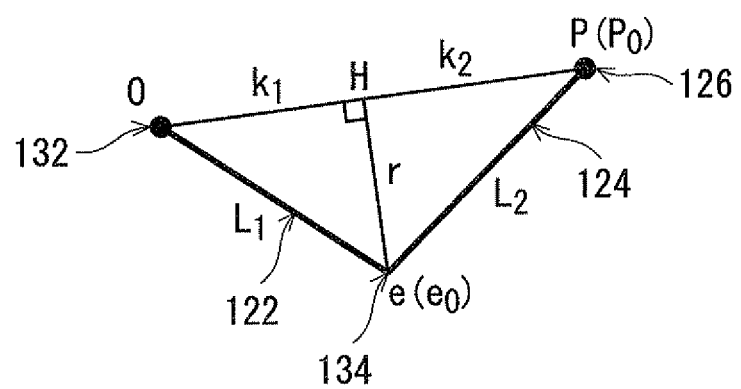
FIG. 6 is a diagram for defining each dimension of cones calculated by a movable area calculation unit according to the first embodiment.

FIG. 6 is a diagram for defining each dimension of the cones calculated by the movable area calculation unit 16 according to the first embodiment. The movable area calculation unit 16 calculates the dimension of each of a cone CL (first cone) formed by the trajectory of the forearm part 124 and a cone CU (second cone) formed by the trajectory of the upper arm part 122. The length of the line segment OP is represented by $L_0$. Further, since the bottom surface of the cone CU is the same as the bottom surface of the cone CL, a radius r of the circle which is the bottom surface of the cone CL is the same as that of the cone CU. The height of the cone CU is represented by $k_1$ and the height of the cone CL is represented by $k_2$. In this case, $k_1+k_2=L_0$ is satisfied. Further, when a foot of a perpendicular to the line segment OP from the position e of the elbow part 134 is represented by H, $k_1$=OH and $k_2$=PH are satisfied. The cone CU is formed by the trajectory obtained by rotating the triangle O-e-H around the line segment OH. Similarly, the cone CL is formed by the trajectory obtained by rotating the triangle P-e-H around the line segment PH.

As described above, the length $L_1$ of the upper arm part 122 and the length $L_2$ of the forearm part 124 are determined in advance. Further, the length of the line segment OP is also determined since the position of the hand part 126 is specified to be the point $P_0$. Therefore, the triangle O-e-P is uniquely determined regardless of the arm angle. Therefore, the movable area calculation unit 16 is able to calculate r, $k_1$, and $k_2$ using the cosine theorem.

Further, the movable area calculation unit 16 converts the coordinate system (x, y, z) of the cone CL, which is the trajectory of the forearm part 124, into the coordinate system (x', y', z') so that the apex (point P) is on the z' axis and the bottom surface is on the x'y' plane. Specifically, the movable area calculation unit 16 carries out a coordinate conversion of the cone CL using the following Expression 3.

$$\begin{bmatrix} x' \\ y' \\ z' \end{bmatrix} = \begin{bmatrix} 1 & 0 & 0 \\ 0 & 1 & 0 \\ 0 & 0 & -1 \end{bmatrix} R_\alpha^{-1} R_\beta^{-1} \begin{bmatrix} x \\ y \\ z \end{bmatrix} + \begin{bmatrix} 0 \\ 0 \\ -k_1 \end{bmatrix} \quad \text{(Expression 3)}$$

In Expression 3, the coordinate system is converted so that the line segment PH is on the z' axis by using the rotation matrix $R_\alpha$ and the rotation matrix $R_\beta$ used in the above Expressions 1 and 2. This coordinate conversion corresponds to the conversion of the coordinate system shown in (A) of FIG. 5 from (x, y, z) to (x', y', z') and corresponds to the trajectory obtained by rotating the forearm part 124 around the OP. Further, in order to place the apex (point P) on the positive side of the z' axis, the sign of the z axis (z' axis) of the coordinate system is changed from positive to negative. Further, in order to move the bottom surface onto the x'y' plane (i.e., plane of z'=0), the coordinate system is offset by $-k_1$ in the z' axis direction. As a result, the point H shown in FIG. 6 coincides with the origin O' of the coordinate system (x', y', z').

Further, the movable area calculation unit 16 calculates the expression of the cone bottom surface after the conversion as shown in the following Expression 4 and calculates the expression of the cone surface (conical surface) (side surface) after the conversion as shown in the following Expression 5.

$$x'^2+y'^2 \le r'^2, z'=0 \quad \text{(Expression 4)}$$

$$k_2^2(x'^2+y'^2)=r^2(z'-k_2)^2, \{z'|0 \le z' \le k_2\} \quad \text{(Expression 5)}$$

Similarly, the movable area calculation unit 16 carries out a coordinate conversion of the cone CU that has been calculated from the coordinate system (x, y, z) to the coordinate system (x', y', z') so that the apex (point O) is on the z' axis and the bottom surface is on the x'y' plane. Specifically, the movable area calculation unit 16 carries out the coordinate conversion of the cone CU using the following Expression 6.

$$\begin{bmatrix} x' \\ y' \\ z' \end{bmatrix} = \begin{bmatrix} 1 & 0 & 0 \\ 0 & 1 & 0 \\ 0 & 0 & 1 \end{bmatrix} R_\alpha^{-1} R_\beta^{-1} \begin{bmatrix} x \\ y \\ z \end{bmatrix} + \begin{bmatrix} 0 \\ 0 \\ k_1 \end{bmatrix} \quad \text{(Expression 6)}$$

In Expression 6, similar to Expression 3, the rotation matrix $R_\alpha$ and the rotation matrix $R_\beta$ used in the above Expressions 1 and 2 are used, whereby the coordinate system is converted so that the line segment OP is on the z' axis. Further, in order to move the bottom surface onto the x'y' plane (i.e., plane of z'=0), the coordinate system is offset by $k_1$ in the z' axis direction. As a result, the point H shown in FIG. 6 coincides with the origin O' of the coordinate system (x', y', z').

Further, the movable area calculation unit 16 calculates the expression of the cone bottom surface after the conversion as shown in the above Expression 4 and calculates the expression of the cone surface (side surface) after the conversion as shown in the following Expression 7.

$$k_1^2(x'^2+y'^2)=r^2(Z'-k_1)^2, \{z'|0 \le z' \le k_1\} \quad \text{(Expression 7)}$$

Figure 7A:
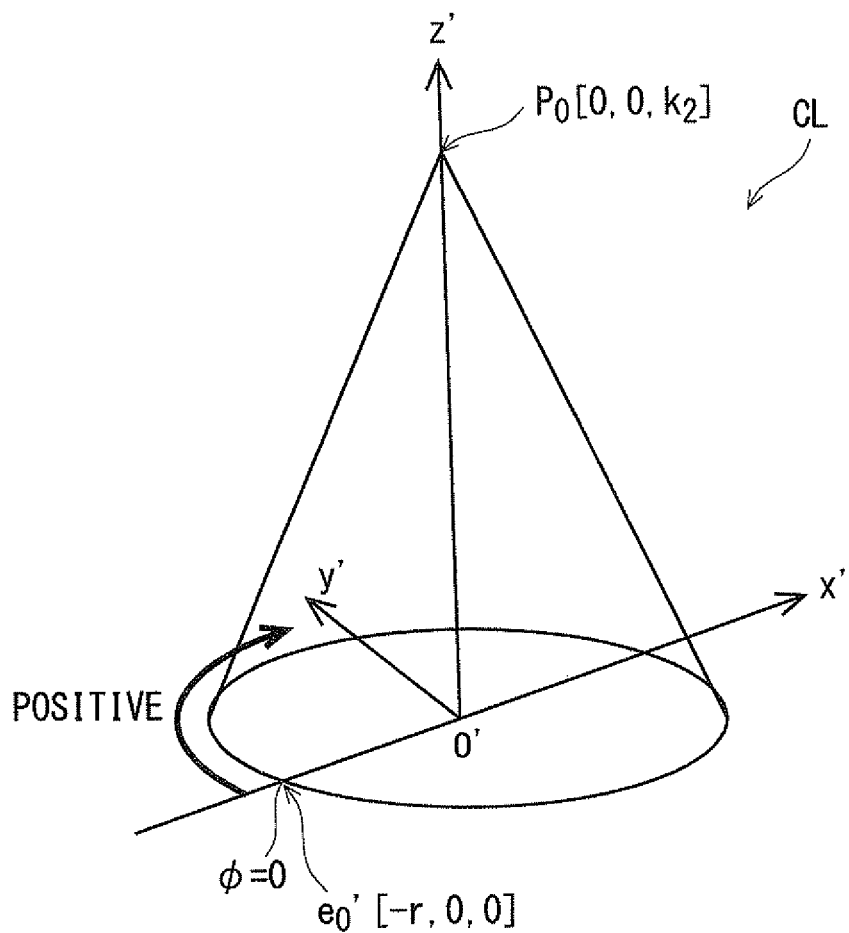
FIGS. 7A and 7B are diagrams showing cones calculated by the movable area calculation unit according to the first embodiment.
Figure 7B:
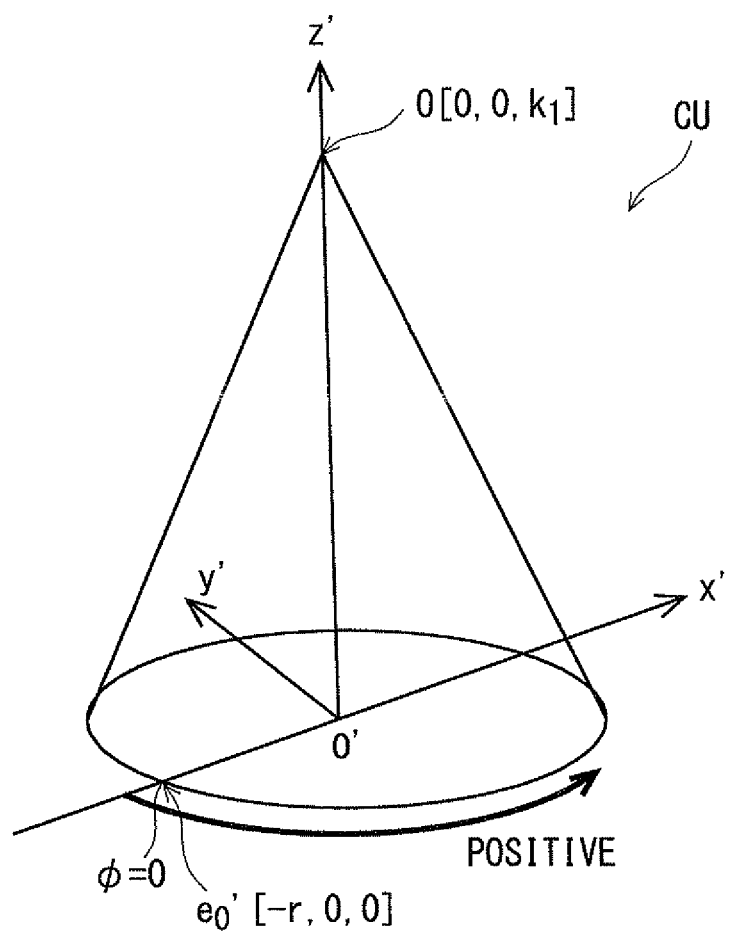

FIGS. 7A and 7B are diagrams showing the cones calculated by the movable area calculation unit 16 according to the first embodiment. As stated above, the movable area calculation unit 16 calculates the cone CL as shown in FIG. 7A and calculates the cone CU as shown in FIG. 7B. When the coordinates of the position $e_0$ when the position e of the elbow part 134 is on the reference plane ((B) in FIG. 5) are converted, the coordinates of the position $e_0'$ after the conversion are [−r, 0, 0]. In this position, the arm angle is indicated by $\phi=0$. Further, the positive direction of the arm angle in the cone CU is, as shown in FIG. 7B, counterclockwise when seen from the positive direction of the z' axis from the arrow A shown in FIG. 2. On the other hand, regarding the cone CL, since the sign of the z axis (z' axis) has been converted from positive to negative when the coordinates are converted, the positive direction of the arm angle of the cone CL is clockwise when seen from the positive direction of the z' axis, which is the opposite to that of the cone CU, as shown in FIG. 7A.

Next, in Step S110, the control device 2 calculates the intersections of the movable areas with the collision determination line segment Ld. Further, in Steps S112 to S120, the control device 2 determines the range in which the robot arm 120 does not collide against the torso 110 in the movable areas (collision avoidance range) using the intersections that have been calculated. In the following description, a mechanism of determining the collision avoidance range using the arm angle according to this embodiment will be described.

As described above, when the position of the hand part 126 has been specified, the movable areas of the robot arm 120 are expressed by two cones CU and CL, which are trajectories obtained by rotating the arm angle $\phi$. In order to avoid the collision of the torso 110 with the robot arm 120, it is required that the robot arm 120 exist outside of the torso 110. In other words, it is required to prevent the line segment (generatrix of the cone CU) that connects the shoulder part 132 and the elbow part 134 on the side surface of the cone CU and the line segment (generatrix of the cone CL) that connects the elbow part 134 and the hand part 126 on the side surface of the cone CL from entering the cuboid Bd that shows the torso 110. That is, it is required to determine the range of the arm angle in which the generatrix of the cone CU and the generatrix of the cone CL do not enter the cuboid Bd.

Figure 8A:
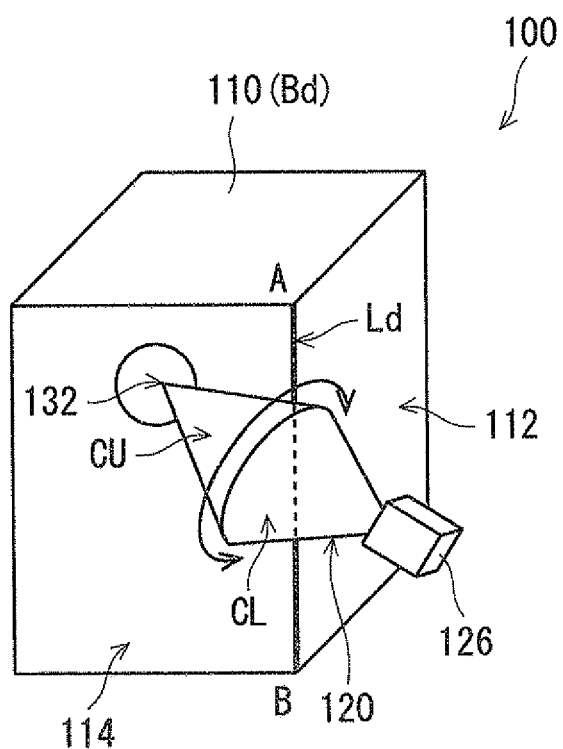
FIGS. 8A to 8C are diagrams each showing a relation between a torso of a robot and a robot arm according to the first embodiment.
Figure 8B:
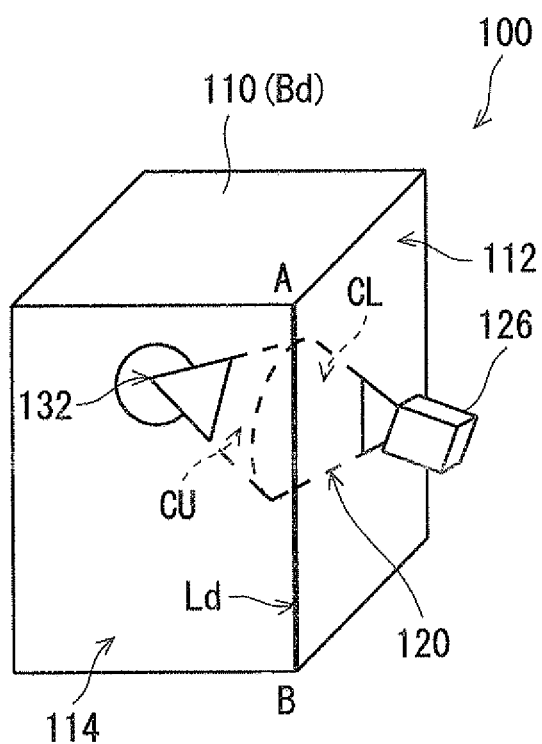
Figure 8C:
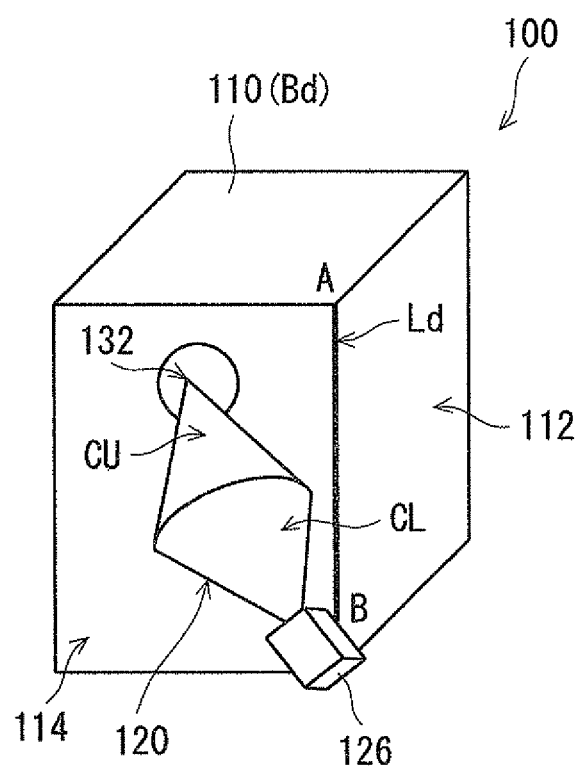

FIGS. 8A, 8B, and 8C are diagrams showing a relation between the torso 110 and the robot arm 120 of the robot 100 according to the first embodiment. In FIGS. 8A, 8B, and 8C, the positional relation between the movable areas (cones CU and CL) and the torso 110 (cuboid Bd) according to the position of the hand part 126 is shown. When the position of the hand part 126 is specified to be the position shown in FIG. 8A, a part of the movable areas (cones CU and CL) enters the cuboid Bd. Therefore, in this case, the range of the arm angle in which the movable areas (cones CU and CL) do not enter the cuboid Bd (collision avoidance range) may be determined.

In the case shown in FIG. 8A, the movable areas (cones CU and CL) intersect with both the torso side surface 114 and the torso front surface 112. Therefore, the movable areas (cones CU and CL) intersect with the line segment AB (collision determination line segment Ld). Therefore, in this embodiment, the collision avoidance range is determined using the intersections of the movable areas (cones CU and CL) with the line segment AB (collision determination line segment Ld).

Further, when the position of the hand part 126 is specified to be the position shown in FIG. 8B, all the movable areas (cones CU and CL) enter the cuboid Bd except for the vicinity of the shoulder part 132 and the vicinity of the hand part 126. In this case, it is impossible to avoid the collision of the torso 110 with the robot arm 120. Therefore, it is determined that there is no collision avoidance range. In the case as shown in FIG. 8B, the movable areas (cones CU and CL) do not intersect with the line segment AB (collision determination line segment Ld).

Further, in the case in which the position of the hand part 126 is specified to be the position shown in FIG. 8C as well, the movable areas (cones CU and CL) do not intersect with the line segment AB (collision determination line segment Ld). On the other hand, in the case shown in FIG. 8C, all the movable areas (cones CU and CL) exist in the outside of the cuboid Bd or the movable areas (cones CU and CL) intersect with only the torso side surface 114. Therefore, in this case, the collision avoidance range is determined from the relation between the movable areas (cones CU and CL) and the torso side surface 114.

Step S110 will now be described. The intersection calculation unit 18 of the control device 2 calculates the intersections of the cones shown in FIGS. 7A and 7B and the collision determination line segment Ld (line segment AB shown in FIG. 1). The intersection calculation unit 18 calculates the intersection of the cone CL with the collision determination line segment Ld and calculates the intersection of the cone CU with the collision determination line segment Ld. In other words, the intersection calculation unit 18 calculates the intersection of the cone CL with the collision determination line segment Ld and the intersection of the cone CU with the collision determination line segment Ld separately. In the following description, the calculation of the intersections for the cone CL and the cone CU will be separately described.

Specifically, when the intersection calculation unit 18 calculates the intersection of the cone CL with the collision determination line segment Ld, the intersection calculation unit 18 converts the coordinate system (x, y, z) of the coordinates of the points A and B into the coordinate system (x', y', z') using the above Expression 3. Therefore, the intersection calculation unit 18 obtains the coordinates of the point N obtained by converting the coordinates of the point A and the coordinates of the point B' obtained by converting the coordinates of the point B. Further, the intersection calculation unit 18 calculates the expression indicating a point $P_{Ld}$ on the collision determination line segment Ld (line segment A'B') as shown in the following Expression 8.

$$P_{Ld} = (B'-A')t + A', \{t | 0 \le t \le 1\} \quad \text{(Expression 8)}$$

In Expression 8, t denotes a parameter. Further, in Expression 8, $P_{Ld}$ denotes the position vector $[x', y', z']^T$ of the point $P_{Ld}$. Similarly, in Expression 8, A' and B' are position vectors of the point A' and the point B', respectively. The intersection calculation unit 18 assigns Expression 8 into Expression 4 and Expression 5 to calculate the solution of t in the quadratic equation that has been obtained. When there is a real number of t that satisfies Expression 4, the intersection calculation unit 18 determines that there is an intersection of the bottom surface of the cone CL with the collision determination line segment Ld. Further, when there is a real number of t that satisfies Expression 5, the intersection calculation unit 18 determines that there is an intersection of the side surface (cone surface) of the cone CL with the collision determination line segment Ld. The intersection calculation unit 18 then calculates the intersection from the value of t that has been obtained.

Similarly, when the intersection calculation unit 18 calculates the intersection of the cone CU with the collision determination line segment Ld, the intersection calculation unit 18 converts the coordinate system (x, y, z) of the coordinates of the point A and the point B into the coordinate system (x', y', z') using the above Expression 6. Therefore, the intersection calculation unit 18 obtains the coordinates of the point A' obtained by converting the point A and the coordinates of the point B' obtained by converting the point B. Further, the intersection calculation unit 18 calculates the expression indicating the point $P_{Ld}$ on the collision determination line segment Ld (line segment A'B') as shown in the above Expression 8, similar to the case of the cone CL. The intersection calculation unit 18 then assigns Expression 8 into Expressions 4 and 7 to calculate the solution of t, similar to the case of the cone CL. When there is a real number of t that satisfies Expression 4, the intersection calculation unit 18 determines that there is an intersection of the bottom surface of the cone CU with the collision determination line segment Ld. Further, when there is a real number of t that satisfies Expression 7, the intersection calculation unit 18 determines that there is an intersection of the side surface (cone surface) of the cone CU with the collision determination line segment Ld. The intersection calculation unit 18 then calculates the intersection from the value of t that has been obtained.

In Step S112, the intersection calculation unit 18 of the control device 2 determines whether there is an intersection of the movable areas (cones CU and CL) with the line segment A'B' (collision determination line segment Ld). When it is determined that there is no intersection (NO in S112), the processing goes to Step S142. On the other hand, when it is determined that there is an intersection (YES in S112), the processing goes to Step S114.

In Step S142, the control device 2 determines whether there is a collision avoidance range. Specifically, the collision avoidance range determination unit 20 of the control device 2 determines whether the positional relation between the movable areas (cones CU and CL) and the torso 110 is as shown in FIG. 8C or as shown in FIG. 8B. For example, the collision avoidance range determination unit 20 may determine that the positional relation between them is as shown in FIG. 8B when the line segment (OP) that connects the shoulder part 132 and the hand part 126 intersects with the torso front surface 112. On the other hand, the collision avoidance range determination unit 20 may determine that the positional relation between them is as shown in FIG. 8C when the line segment OP does not intersect with the torso front surface 112.

When it is determined that there is no collision avoidance range (NO in S142), which means when it is determined that the state is as shown in FIG. 8B, the processing goes to S140. On the other hand, when it is determined that there is a collision avoidance range (YES in S142), which means when it is determined that the state is as shown in FIG. 8C, the collision avoidance range determination unit 20 determines the range of the arm angle in which collision can be avoided (collision avoidance range $\phi$s) from the relation between the movable areas (cones CU and CL) and the torso side surface 114 in Step S144. In this case, the collision avoidance range determination unit 20 determines the range of the arm angle which is in the outside of the torso side surface 114 as the collision avoidance range from the intersection of the movable areas (cones CU and CL) with the torso side surface 114. When there is no intersection of the movable areas (cones CU and CL) with the torso side surface 114, the collision avoidance range determination unit 20 determines the whole circumference of the arm angle as the collision avoidance range $\phi$s.

In Step S114, the collision avoidance range determination unit 20 determines the existence range of the arm angle in the forearm part 124 (range of the arm angle $\phi$ where the robot arm 120 does not collide against the torso 110). Specifically, the collision avoidance range determination unit 20 determines whether there is an intersection of the bottom surface of the cone CL with the collision determination line segment Ld (line segment A'B'). Further, the collision avoidance range determination unit 20 determines how many intersections of the side surface (cone surface) of the cone CL with the collision determination line segment Ld there are.

Figure 9:
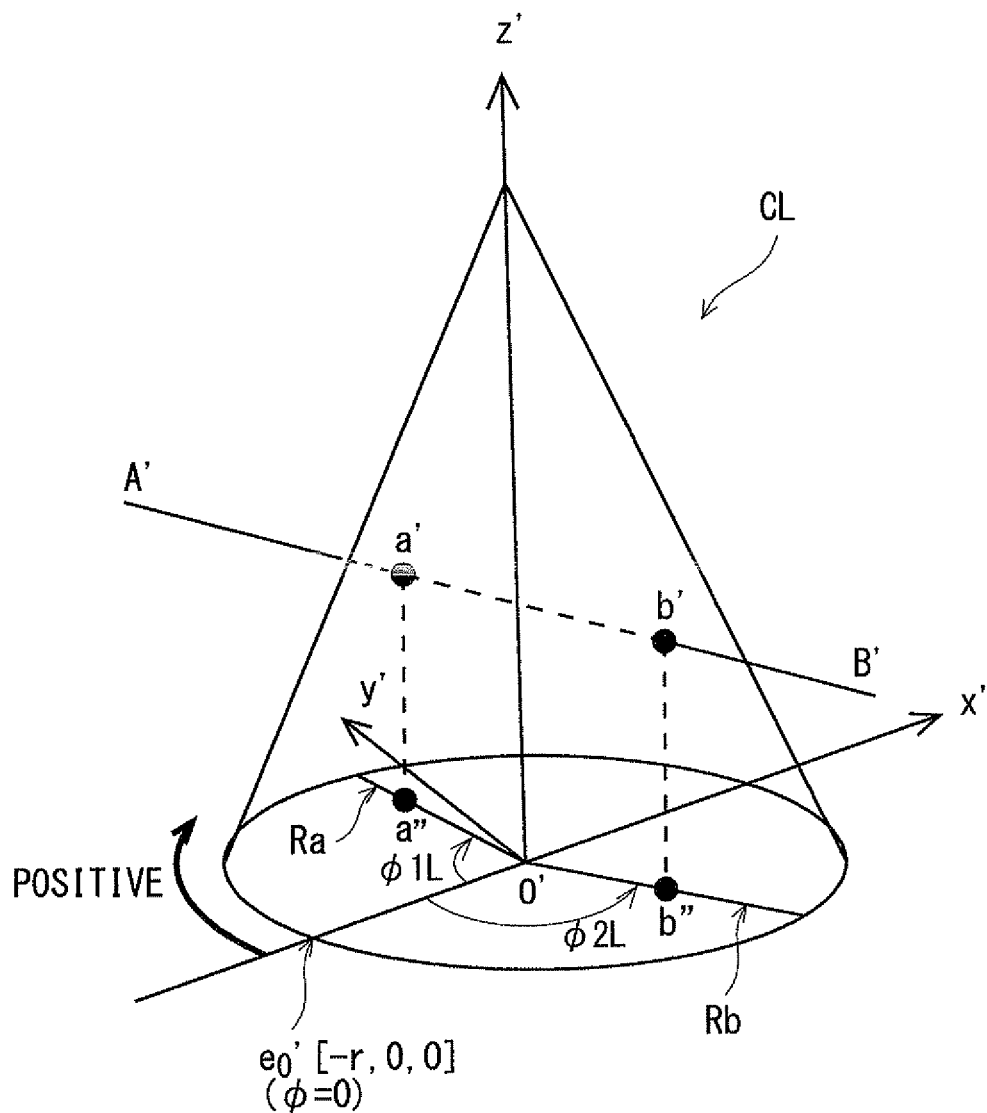
FIG. 9 is a diagram showing an example of a case in which there are two intersections of a side surface of the cone shown in FIG. 7A with a collision determination line segment.

FIG. 9 is a diagram showing an example of a case in which there are two intersections of the side surface of the cone CL shown in FIG. 7A and the collision determination line segment Ld. When the quadratic equation of t obtained by assigning Expression 8 into Expression 5 has two real solutions, as shown in FIG. 9, there are two intersections of the side surface of the cone CL with the collision determination line segment Ld (line segment A'B'). In this case, there is no intersection of the bottom surface with the collision determination line segment Ld.

The collision avoidance range determination unit 20 acquires the coordinates of the intersections a' and b' calculated by the intersection calculation unit 18. The collision avoidance range determination unit 20 then calculates a point a", which is a mapping obtained by projecting the intersection a' onto the bottom surface of the cone CL (orthographic projection) using the coordinates of the intersection a'. The cone CL is a right circular cone and the bottom surface is on the x'y' plane. Therefore, when the coordinates of the intersection a' are [$x_a'$, $y_a'$, $z_a'$], the coordinates of the point a" are [$x_a'$, $y_a'$, 0]. Similarly, the collision avoidance range determination unit 20 calculates a point b", which is a mapping obtained by projecting the intersection b' onto the bottom surface of the cone CL (orthographic projection) using the coordinates of the intersection b'.

Further, the collision avoidance range determination unit 20 calculates an angle φ1L of a radius Ra that passes the point a" based on the negative direction of the x' axis (radius that passes the point $e_0'$[−r, 0, 0]) on the bottom surface of the cone CL. Further, similarly, the collision avoidance range determination unit 20 calculates an angle φ2L of a radius Rb that passes the point b" based on the negative direction of the x' axis on the bottom surface of the cone CL. As described above using FIG. 7A, the reference point of the arm angle φ, which is the point of φ=0, is the point $e_0'$. Therefore, the angles φ1L and φ2L that have been calculated are limiting angles (boundary angles) of the arm angle φ. As described above, in the cone CL, the positive direction of the arm angle is the clockwise direction when seen from the z' axis positive direction. Therefore, when the point a' and the point b' are positioned as shown in FIG. 9, if it is assumed that −π≤φ≤π, φ1L>0 and φ2L<0 are satisfied.

Next, the collision avoidance range determination unit 20 determines an existence range φL (first range) of the arm angle in the forearm part 124 using the angles φ1L and φ2L that have been calculated. In other words, the collision avoidance range determination unit 20 determines the existence range of the arm angle φ in which the forearm part 124 of the robot arm 120 does not collide against the torso 110. The angles φ1L and φ2L are boundary angles of the existence range φL of the arm angle. Therefore, the existence range φL of the arm angle in the cone CL is one of the range from φ2L to φ1L in the clockwise direction (side including the point $e_0'$) and the range from φ1L to φ2L in the clockwise direction (side that does not include the point $e_0'$). In the following description, the determination method will be described.

Figure 10:
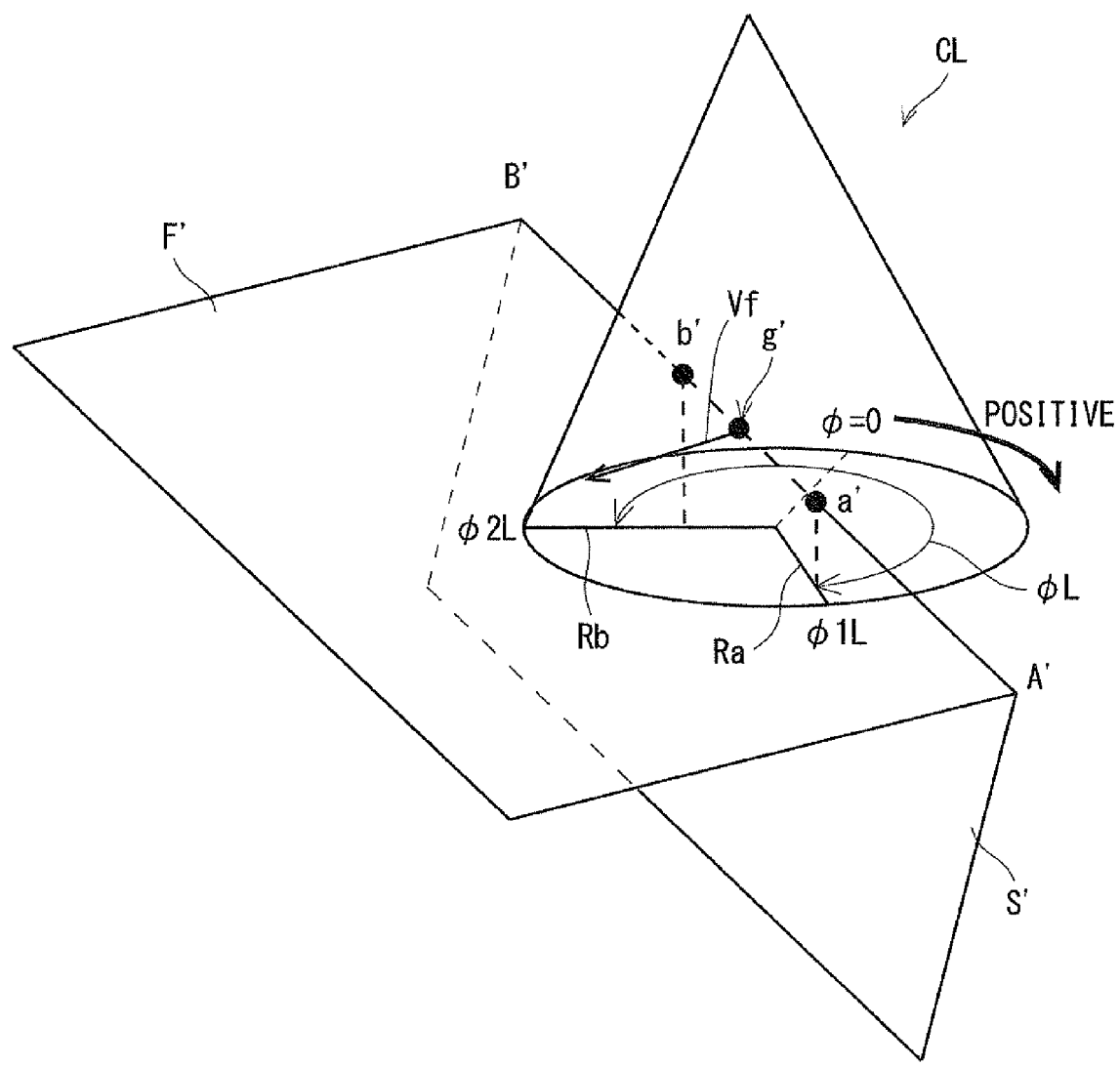
FIG. 10 is a diagram for describing a method of determining an existence range of an arm angle in the example shown in FIG. 9.

FIG. 10 is a diagram for describing the method of determining the existence range φL of the arm angle in the example of FIG. 9. In FIG. 10, a plane F' and a plane S' obtained by converting the coordinates of the torso front surface 112 and the torso side surface 114 using Expression 3 are overlapped with the cone CL. Since the existence range φL of the arm angle is the range that does not collide against the torso 110, the side in which the cone CL does not get into the torso may be set as the existence range φL of the arm angle.

For example, the collision avoidance range determination unit 20 calculates a vector Vf having an arbitrary length on the torso front surface 112 starting from an arbitrary point on the line segment a'b' (e.g., midpoint g'). The collision avoidance range determination unit 20 projects the vector Vf onto the bottom surface of the cone CL (i.e., x'y' plane) (orthographic projection). The collision avoidance range determination unit 20 then determines the range of the side that does not intersect with the mapping of the vector Vf as the existence range φL of the arm angle. In the examples shown in FIGS. 9 and 10, the existence range φL of the arm angle is the range from φ2L to φ1L in the clockwise direction (φ2L≤φ≤φ1L). Further, for example, the collision avoidance range determination unit 20 may set the side including φ=0 (side including the point $e_0'$) to be the existence range φL of the arm angle.

Figure 11:
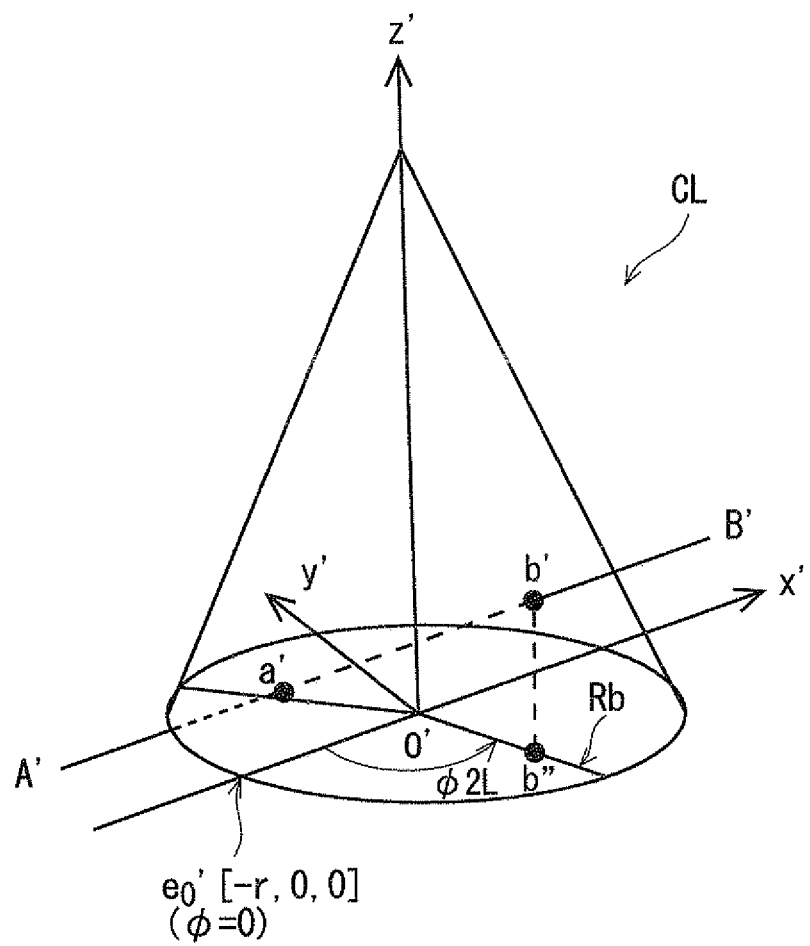
FIG. 11 is a diagram showing an example of a case in which there is one intersection of a bottom surface of the cone shown in FIG. 7A with the collision determination line segment.

FIG. 11 is a diagram showing an example of a case in which there is one intersection of the bottom surface of the cone CL shown in FIG. 7A with the collision determination line segment Ld. When there is one t of Expression 8 that satisfies Expression 4, as shown in FIG. 11, there is one intersection (a') of the bottom surface of the cone CL with the collision determination line segment Ld (line segment A'B'). Further, in this case, there is one intersection (b') of the side surface of the cone CL with the collision determination line segment Ld. That is, the quadratic equation of t obtained by assigning Expression 8 into Expression 5 has one real solution.

Similar to the case shown in FIG. 9, the collision avoidance range determination unit 20 acquires the coordinates of the intersections a' and b' calculated by the intersection calculation unit 18. In FIG. 11, the point a' is on the bottom surface and the point b' is on the side surface. In this case, the collision avoidance range determination unit 20 calculates the point b", which is a mapping obtained by projecting the intersection b' onto the bottom surface of the cone CL (orthographic projection) using the coordinates of the intersection b'. Further, the collision avoidance range determination unit 20 calculates the angle φ2L of the radius Rb that passes the point b" based on the negative direction of the x' axis on the bottom surface of the cone CL. This angle φ2L is one of the boundary angle of the arm angle φ. In the following description, the method of calculating the other boundary angle φ1L will be described.

Figure 12:
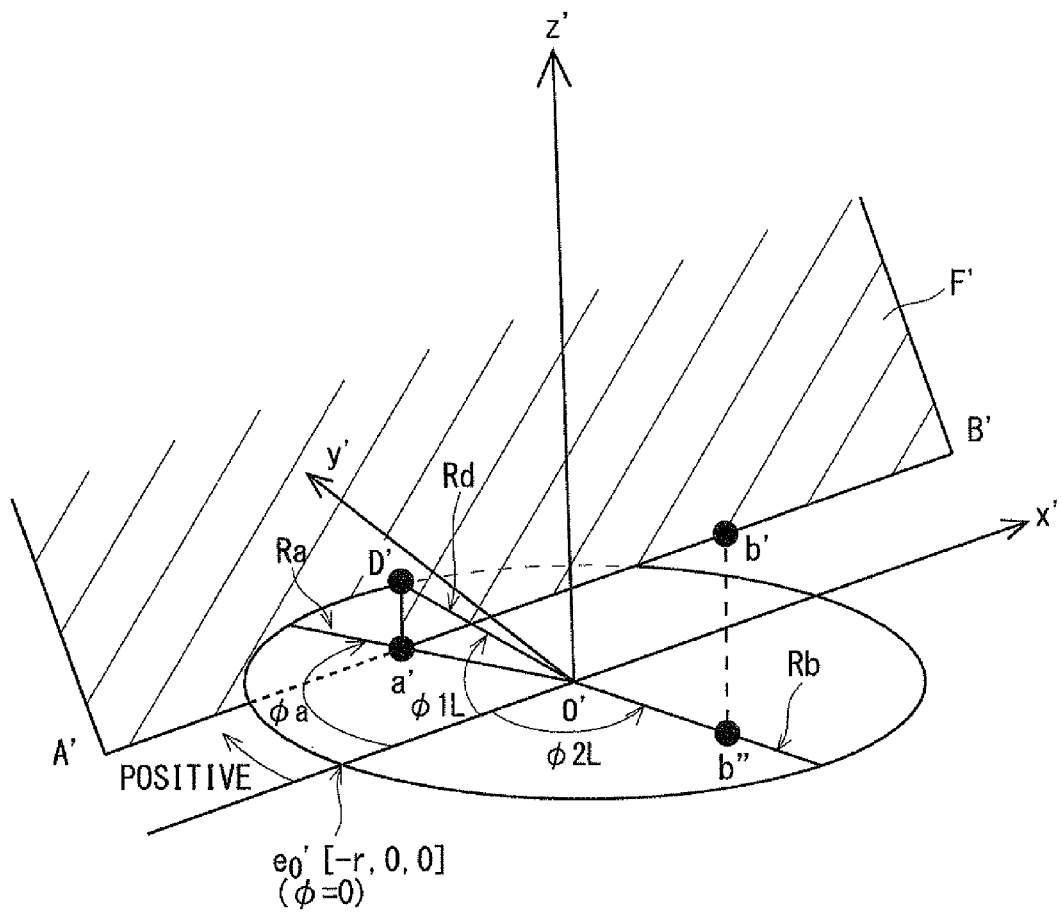
FIG. 12 is a diagram for describing a method of determining the existence range of an arm angle $\phi$ in the example of FIG. 11.

FIG. 12 is a diagram for describing the method of determining the existence range φL of the arm angle in the example shown in FIG. 11. As described above, one of the boundary angles of the arm angle φ is φ2L. The plane F' after the coordinate conversion of the torso front surface 112 into the x'y'z' coordinate system passes the point a'. At this time, the collision avoidance range determination unit 20 calculates an intersection D' of the plane F' with the circumference that forms the bottom surface of the cone CL. Further, the collision avoidance range determination unit 20 calculates the angle of the radius Rd that passes the intersection D' based on the negative direction of the x' axis on the bottom surface of the cone CL. The collision avoidance range determination unit 20 determines this angle as the boundary angle φ1L. Further, the collision avoidance range determination unit 20 determines the range of the side including the angle φa of the radius Ra that passes the intersection a' based on the negative direction of the x' axis, which is the range from φ2L to φ1L in the clockwise direction (φ2L≤φ≤φ1L), as the existence range φL of the arm angle.

Figure 13:
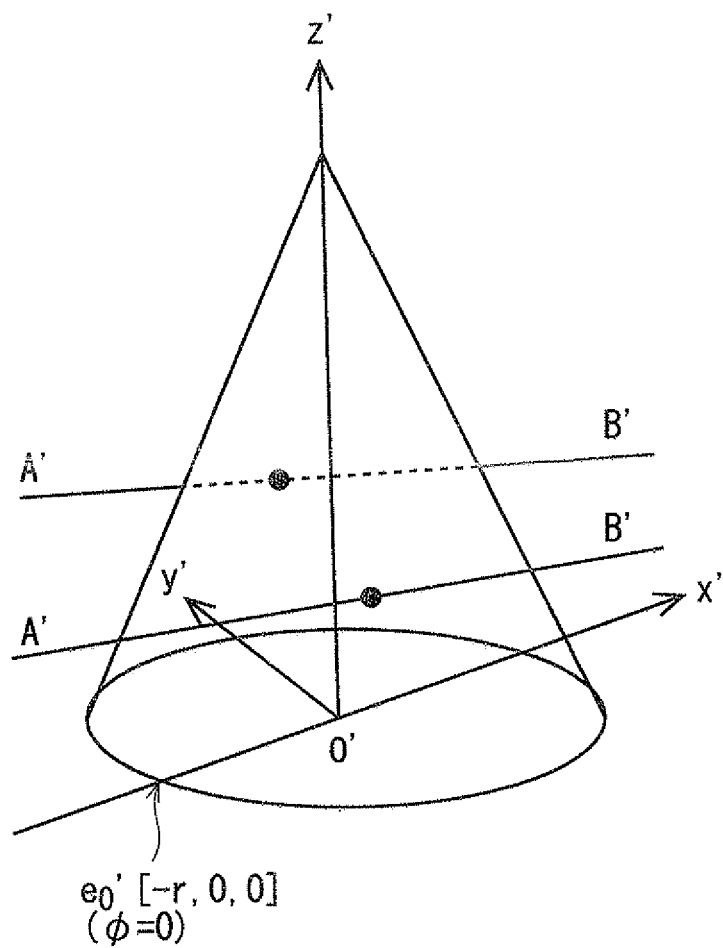
FIG. 13 is a diagram showing an example of a case in which there is one intersection of the side surface of the cone shown in FIG. 7A with the collision determination line segment.

FIG. 13 is a diagram showing an example in which there is one intersection of the side surface of the cone CL shown in FIG. 7A with the collision determination line segment Ld. When the quadratic equation of t obtained by assigning Expression 8 into Expression 5 has one multiple root, as shown in FIG. 13, there is one intersection of the side surface of the cone CL with the collision determination line segment Ld (line segment A'B'). In other words, the collision determination line segment Ld contacts the side surface of the cone CL. The contact point of the collision determination line segment Ld with the side surface of the cone CL is the intersection. In this case, there is no intersection of the bottom surface with the collision determination line segment Ld.

In this case, the collision avoidance range determination unit 20 determines whether the line segment (OP) that connects the shoulder part 132 and the hand part 126 passes inside the torso 110 with respect to the collision determination line segment Ld. This determination may be performed either in the coordinate system x'y'z' after the coordinate conversion or in the coordinate system xyz before the coordinate conversion. When the line segment (OP) passes inside the torso 110 with respect to the collision determination line segment Ld, it is impossible to avoid collision against the torso 110 for all the ranges of the arm angle φ. Therefore, the collision avoidance range determination unit 20 determines that there is no existence range φL of the arm angle. In this case, if the robot arm 120 is allowed to contact the torso 110, the collision avoidance range determination unit 20 may calculate the arm angle φ from the intersection (contact point), similar to the example shown in FIG. 9, to determine only the arm angle φ as the existence range φL of the arm angle.

On the other hand, when the line segment (OP) passes outside the torso 110 with respect to the collision determination line segment Ld, the arm angle does not collide against the torso 110 for all the ranges of the arm angle φ. Therefore, the collision avoidance range determination unit 20 determines the whole circumference of the arm angle as the existence range φL of the arm angle. In this case, if the robot arm 120 is not allowed to contact the torso 110, the collision avoidance range determination unit 20 may calculate the arm angle φ from the intersection (contact point), similar to the example shown in FIG. 9, to determine the range except for only the arm angle φ as the existence range φL of the arm angle.

Next, in Step S116, the collision avoidance range determination unit 20 determines an existence range φU (second range) of the arm angle in the upper arm part 122. Specifically, similar to the processing of S114, the collision avoidance range determination unit 20 determines whether there is an intersection of the bottom surface of the cone CU with the collision determination line segment Ld (line segment A'B'). Further, similar to the processing of S114, the collision avoidance range determination unit 20 determines how many intersections of the side surface (cone surface) of the cone CU with the collision determination line segment Ld there are.

Since specific processing of S116 is similar to that of S114, the description thereof will be omitted. However, the positive direction of the arm angle φ in the cone CU is different from that of the cone CL. Further, since the upper arm part 122 is present on the side of the torso side surface 114, the "torso front surface 112" in the processing of S114 can be replaced by the "torso side surface 114".

Specifically, in S116, the "vector Vf" described with reference to FIG. 10 can be replaced by a "vector Vs" having an arbitrary length on the torso side surface 114. That is, the collision avoidance range determination unit 20 calculates the vector Vs having an arbitrary length on the torso side surface 114 starting from an arbitrary point on the line segment a'b' (e.g., midpoint g'). The collision avoidance range determination unit 20 then determines the existence range φU of the arm angle using the vector Vs.

Further, in FIG. 12, the collision avoidance range determination unit 20 has calculated the intersection D' of the plane F' obtained by converting the coordinates of the torso front surface 112 with the circumference that forms the bottom surface of the cone CL. On the other hand, in S116, the collision avoidance range determination unit 20 calculates the intersection D' of the plane S' obtained by converting the coordinates of the torso side surface 114 with the circumference that forms the bottom surface of the cone CU to perform similar processing.

When the cone CL regarding the forearm part 124 is as shown in FIG. 9 or 13 in S114, which means when the collision determination line segment Ld has an intersection with only the side surface of the cone CL and there is no intersection of the bottom surface of the cone CL with the collision determination line segment Ld, there is no intersection with the collision determination line segment Ld in the cone CU regarding the upper arm part 122. In this case, in the processing of S116, the collision avoidance range determination unit 20 determines the whole circumference of the arm angle φ as the existence range φU of the arm angle in the cone CU. Similarly, when the collision determination line segment Ld has an intersection with only the side surface of the cone CU and there is no intersection of the bottom surface of the cone CU with the collision determination line segment Ld in S116, the collision avoidance range determination unit 20 determines the whole circumference of the arm angle φ as the existence range φL of the arm angle in the cone CL in the processing of S114.

Next, in Step S120, the collision avoidance range determination unit 20 determines the collision avoidance range φs of the arm angle φ using φL and φU that have been determined. Specifically, the collision avoidance range determination unit 20 determines the range in which φL and φU overlap with each other as the collision avoidance range φs.

As stated above, when the collision determination line segment Ld has an intersection with only the side surface of the cone CL in the cone CL and there is no intersection of the bottom surface of the cone CL with the collision determination line segment Ld, the existence range φU of the arm angle in the cone CU is the whole circumference of the arm angle φ. Therefore, the collision avoidance range determination unit 20 determines the existence range φL of the arm angle in the cone CL as the collision avoidance range φs. Similarly, when the collision determination line segment Ld intersects with only the side surface of the cone CU in the cone CU and there is no intersection of the bottom surface of the cone CU with the collision determination line segment Ld, the existence range φL of the arm angle in the cone CL is the whole circumference of the arm angle φ. Therefore, the collision avoidance range determination unit 20 determines the existence range φU of the arm angle in the cone CU as the collision avoidance range φs.

On the other hand, when the collision determination line segment Ld intersects with the side surface and the bottom surface of the cone CL in the cone CL, the collision determination line segment Ld intersects with the side surface and the bottom surface of the cone CU in the cone CU as well. In such a case, a part of φL and a part of φU overlap each other. The collision avoidance range determination unit 20 therefore determines the range in which φL and φU overlap each other as the collision avoidance range φs. In such a case, the forearm part 124 collides against the torso 110 (the collision determination line segment Ld on the torso 110) at one boundary angle of the collision avoidance range φs of the arm angle and the upper arm part 122 collides against the torso 110 (the collision determination line segment Ld on the torso 110) at the other boundary angle.

Next, in Step S130, the collision avoidance range determination unit 20 determines the target arm angle φt. Specifically, the collision avoidance range determination unit 20 sets the arm angle φ that satisfies the collision avoidance range φs as the target arm angle φt. For example, the collision avoidance range determination unit 20 may set the median value of the collision avoidance range φs as the target arm angle φ.

Further, when the pre-configuration is carried out by the processing of S102 or the target hand position is determined by the processing of S104, the collision avoidance range determination unit 20 may determine the optimal arm angle $\phi_0$ that specifies the reference posture of the robot arm 120 from the allowable joint angle of each joint of the robot arm 120. The collision avoidance range determination unit 20 may determine the target arm angle φt using the optimal arm angle $\phi_0$. For example, the optimal arm angle $\phi_0$ may be set using the intermediate value of the allowable joint angle. When the optimal arm angle $\phi_0$ is included in the collision avoidance range φs, the collision avoidance range determination unit 20 may determine the optimal arm angle $\phi_0$ as the target arm angle φt. On the other hand, when the optimal arm angle $\phi_0$ is not included in the collision avoidance range φs, the collision avoidance range determination unit 20 may determine the boundary angle of the collision avoidance range φs on the side closer to the optimal arm angle $\phi_0$ as the target arm angle φt.

Next, in Step S132, the control device 2 calculates the joint angle of each joint of the robot arm 120. Specifically, the joint angle calculation unit 22 of the control device 2 calculates the joint angles $\theta_1$ to $\theta_7$ of each joint (first joint part 141 to seventh joint part 147) by the inverse kinematics calculation using the target arm angle φt in the arm angle φ that has been determined. Specifically, the joint angle calculation unit 22 calculates each of the joint angles $\theta_1$ to $\theta_7$ by the method shown below.

Figure 14:
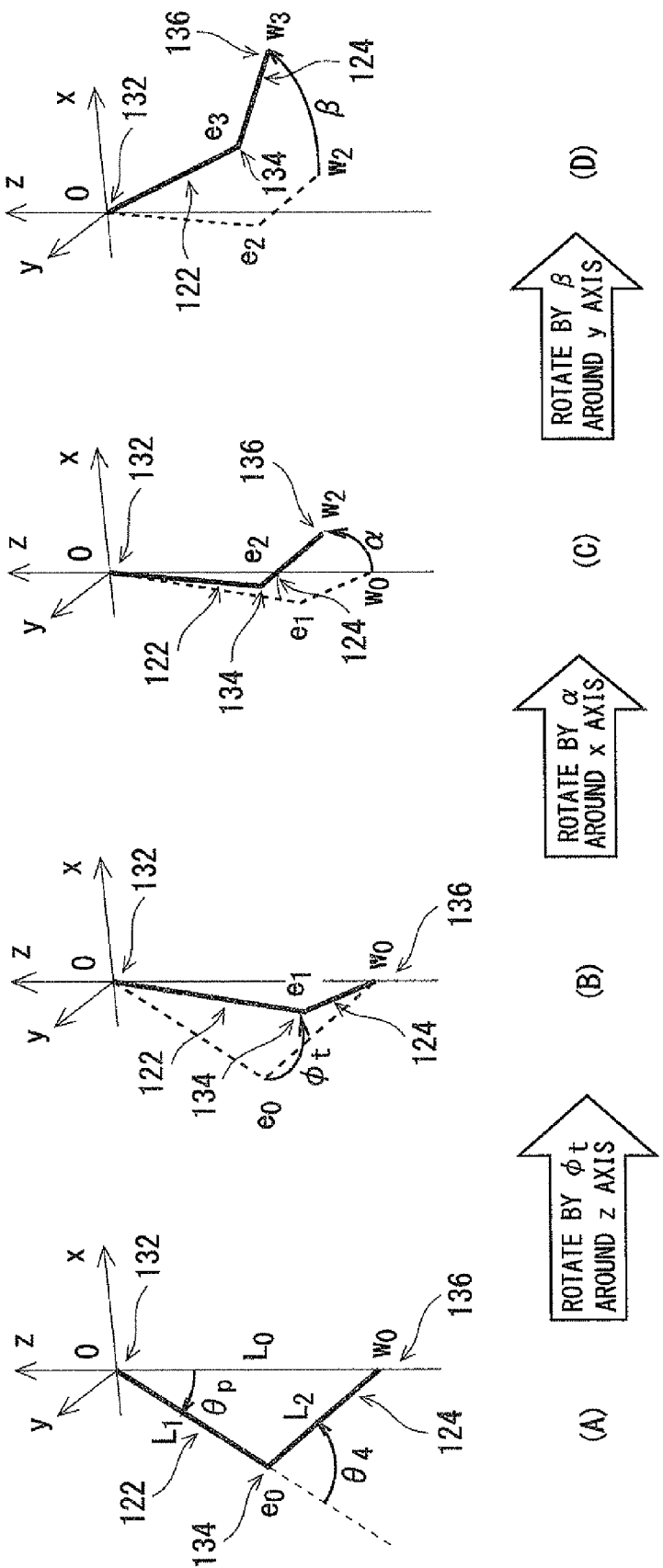
FIG. 14 is a diagram for describing a method of calculating a joint angle using an inverse kinematics calculation.

FIG. 14 is a diagram for describing a method of calculating the joint angle using the inverse kinematics calculation. Since it is assumed that the position and the posture of the hand part 126 are the same as the position and the posture of the wrist part 136, the hand position will be described as the wrist position and the hand posture will be described as the wrist posture in the following description. Assume that the hand position determination unit 14 has determined a target position $^0x_7$ of the wrist part 136 and a target posture $^0R_7$ of the wrist part 136 in S104. The symbol "$^ix_k$" indicates the position of the k-th joint seen from the i-th joint. Further, the symbol "$^iR_k$" indicates the posture of the k-th joint seen from the i-th joint. When i=0, it indicates the case seen from the position of the shoulder part 132, which is the origin O.

As shown in (A) of FIG. 14, the joint angle calculation unit 22 virtually sets the position of the robot arm 120 to place the elbow part 134 in the region of x<0 on the xz plane and the position of the hand part 126 (wrist part 136) on the z axis. At this time, the joint angle calculation unit 22 calculates the joint angle $\theta_4$ of the fourth joint part 144 which is the joint of the elbow part 134 by the following Expression 9 from the cosine theorem (see FIG. 6).

$$\theta_4 = \cos^{-1}\{(L_1^2+L_2^2-L_0^2)/2L_1L_2\}-\pi \because L_0=|^0x_7| \quad \text{(Expression 9))}$$

Further, the joint angle calculation unit 22 calculates the angle θp between the upper arm part 122 and the z axis, which is the angle θp between the upper arm part 122 and the line segment that connects the shoulder part 132 and the wrist part 136 by the following Expression 10 from the cosine theorem.

$$\theta_p = \cos^{-1}\{(L_0^2+L_1^2-L_2^2)/2L_0L_1\} \quad \text{(Expression 10)}$$

At this time, the position vector $e_0$ corresponding to the position of the elbow part 134 and a position vector $w_0$ corresponding to the position of the wrist part 136 are expressed by the following Expression 11.

$$e_0 = [-L_1\sin(\theta_P) 0 -L_1\cos(\theta_P)]^T$$

$$w_0 = [0 0 -L_0]^T \quad \text{(Expression 11)}$$

The joint angle calculation unit 22 rotates the virtual robot arm 120 (virtual robot arm $O-e_0-w_0$) shown in (A) of FIG. 14 by the target arm angle φt around the z axis as shown in (B) of FIG. 14. Further, the joint angle calculation unit 22 rotates the virtual robot arm $O-e_1-w_0$ shown in (B) of FIG. 14 by the angle α around the x axis as shown in (C) of FIG. 14. Further, the joint angle calculation unit 22 rotates the virtual robot arm $O-e_2-w_2$ shown in (C) of FIG. 14 by the angle β around the y axis as shown in (D) of FIG. 14. The signs α and β are obtained from the above Expressions 1 and 2. When the virtual robot arm is rotated as stated above, $w_3$ becomes equal to the target hand position $^0x_7$. Further, $e_3$ is in the position of the elbow part 134 in the target arm angle φt.

Here, the rotation matrices corresponding to the joint angles $\theta_1$ to $\theta_7$ are respectively represented by $R_1$ to $R_7$. Further, the joint angle calculation unit 22 calculates a position vector $^3I_{se}$ corresponding to the position of the elbow part 134 seen from the shoulder part 132 when each joint angle is set to 0 and a position vector $^4I_{ew}$ corresponding to the position of the wrist part 136 seen from the elbow part 134 using the following Expression 12.

$$^3I_{se} = [0 0 -L_1]^T$$

$$^4I_{ew} = [0 0 -L_2]^T \quad \text{(Expression 12)}$$

Further, since the position of the wrist part 136 is determined regardless of each joint angle of the wrist part 136, the joint angle calculation unit 22 calculates the position vector corresponding to the position of the wrist part 136 by the following Expression 13.

$$^0x_7 = w_3 = ^0R_3(^3I_{se}+^3R_4{}^4I_{ew}) \quad \text{(Expression 13)}$$

Further, the posture of the wrist part 136 is expressed by the following Expression 14 separately for the shoulder part 132, the elbow part 134, and the wrist part 136.

$$^0R_7 = ^0R_3{}^3R_4{}^4R_7 \quad \text{(Expression 14)}$$

The joint angle calculation unit 22 calculates the following Expression 15 from Expression 14 using the above signs α, β, φt, and θp.

$$^0R_7 = R_\beta R_\alpha R_{\phi t} R_{\theta p}{}^3R_4{}^4R_7 \quad \text{(Expression 15)}$$

Further, the position vector $e_3$ can be calculated using $^0R_2$ composed of only $\theta_1$ and $\theta_2$. Therefore, the joint angle calculation unit 22 calculates the position vector $e_3$ of the elbow part 134 by the following Expression 16. The joint angle calculation unit 22 calculates $\theta_1$ and $\theta_2$ by assigning α, β, φt, and θp into Expression 16.

$$e_3 = R_\beta R_\alpha R_{\phi t} R_{\theta p}^3 I_{se} = ^0R_2{}^3I_{se} \quad \text{(Expression 16)}$$

$$= \begin{bmatrix} \cos\theta_1 & 0 & \sin\theta_1 \\ 0 & 1 & 0 \\ -\sin\theta_1 & 0 & \cos\theta_1 \end{bmatrix} \begin{bmatrix} 1 & 0 & 0 \\ 0 & \cos\theta_2 & -\sin\theta_2 \\ 0 & \sin\theta_2 & \cos\theta_2 \end{bmatrix} {}^3I_{se}$$

Further, considering the posture of the shoulder part 132 based on three degrees of freedom, the posture ($^0R_3$) of the third joint part 143 coincides with the posture in α, β, φt, and θp, as shown in the following Expression 17. Therefore, the joint angle calculation unit 22 calculates $\theta_3$ using Expression 17.

$$^{0}R_{3} = {}^{0}R_{2}{}^{2}R_{3} \quad \text{(Expression 17)}$$

$$= {}^{0}R_{2}\begin{bmatrix} \cos\theta_3 & -\sin\theta_3 & 0 \\ \sin\theta_3 & \cos\theta_3 & 0 \\ 0 & 0 & 1 \end{bmatrix}$$

$$= R_\beta R_\alpha R_{\phi t} R_{\theta p}$$

Further, considering the posture of the wrist part 136 based on three degrees of freedom, $^{4}R_{7}$ is defined as shown in the following Expression 18. The joint angle calculation unit 22 calculates $\theta_5$ to $\theta_7$ using Expression 18.

$$^{4}R_{7} = \begin{bmatrix} \cos\theta_5 & -\sin\theta_5 & 0 \\ \sin\theta_5 & \cos\theta_5 & 0 \\ 0 & 0 & 1 \end{bmatrix} \begin{bmatrix} \cos\theta_6 & 0 & \sin\theta_6 \\ 0 & 1 & 0 \\ -\sin\theta_6 & 0 & \cos\theta_6 \end{bmatrix} \quad \text{(Expression 18)}$$

$$\begin{bmatrix} 1 & 0 & 0 \\ 0 & \cos\theta_7 & -\sin\theta_7 \\ 0 & \sin\theta_7 & \cos\theta_7 \end{bmatrix}$$

$$= ({}^{0}R_{3}{}^{3}R_{4})^{-1.0}R_{7}$$

In Step S134, the control device 2 operates the robot arm 120. Specifically, the robot arm controller 24 of the control device 2 controls each joint of the robot arm 120 so that each joint has the angle calculated in S132. At this time, the robot arm controller 24 may check an operation region and a speed region allowed in each joint of the robot arm 120. When the operation region or the speed region is not satisfied, the control device 2 may determine the target arm angle φt again.

In this embodiment, the movable areas of the robot arm 120 are shown as the cones and the collision avoidance range is determined according to the intersections of the cones (cones CL and CU) with the collision determination line segment Ld on the surface of the torso 110. The intersections of the cones with the line segment can be easily calculated by the simple geometrical method. It is therefore possible in this embodiment to determine the collision avoidance range of the robot arm 120 at a high speed.

Another method to avoid the collision of the robot arm includes, for example, a method of setting a potential field in advance regarding a series of arm trajectories and searching the path that can avoid the collision using the potential field. However, in such a numerical analysis method, it is required to perform repeated calculation, which may take an enormous amount of time before the solution converges so that the path is eventually searched. There is another method to store a table indicating each joint angle where the collision can be avoided in advance and refer to the table as necessary. However, in this method, the table needs to be set in advance, and this method does not calculate the solution with which the collision can be avoided as appropriate.

On the other hand, in this embodiment, as stated above, the collision avoidance range of the robot arm 120 can be determined by the simple geometrical method. Therefore, in this embodiment, it is possible to carry out the calculation to avoid the collision of the robot arm at a high speed. In other words, it is possible to determine the collision avoidance solution of the robot arm in real time. Further, in this embodiment, the collision avoidance solution can be determined at a high speed (in real time), whereby it is possible to determine the collision avoidance solution for each control cycle of the robot. Further, since the collision avoidance solution can be determined at a high speed, it is possible to reduce the control cycle of the robot, whereby it is possible to improve the response performance of the force control. That is, in this embodiment, each joint angle can be obtained at a high speed in consideration of the collision avoidance of the robot arm 120 with the torso 110, whereby it is possible to perform the force control at a high frequency and therefore achieve a robot which can perform a high-response force interaction.

Further, in this embodiment, the trajectory (cone CU) of the movable area of the upper arm part 122 and the trajectory (cone CL) of the movable area of the forearm part 124 are calculated separately. According to this separate calculation, a simple calculation method to simply calculate the intersections of the cones with the line (line segment) can be applied. It is therefore possible to determine the collision avoidance range of the robot arm 120 much faster.

Further, in this embodiment, the coordinate conversion is carried out so that the bottom surface of the cone is on the x'y' plane and the apex is on the z' axis. It is therefore possible to further simplify the calculation to avoid the collision of the robot arm 120. It is therefore possible to determine the collision avoidance range of the robot arm 120 much faster.

In this embodiment, when the collision determination line segment Ld intersects with the side surface and the bottom surface of the cone CL in the cone CL and the collision determination line segment Ld intersects with the side surface and the bottom surface of the cone CU in the cone CU, the range in which the existence ranges φL and φU of the arm angle overlap with each other determined by the collision avoidance range determination unit 20 is determined as the collision avoidance range φs. According to such a configuration, even when the forearm part 124 collides against the torso 110 (the collision determination line segment Ld on the torso 110) at one boundary angle of the collision avoidance range φs of the arm angle and the upper arm part 122 collides against the torso 110 (the collision determination line segment Ld on the torso 110) at the other boundary angle, the collision avoidance range can be determined by the simple geometrical method. It is therefore possible to determine the collision avoidance range of the robot arm 120 much faster.

Further, in such a case, the boundary angle φ1L of the existence range φL of the arm angle in the forearm part 124 is calculated using the intersection of the bottom surface of the cone CL with the collision determination line segment Ld. In a similar way, the boundary angle φ1U of the existence range φU of the arm angle in the upper arm part 122 is calculated using the intersection of the bottom surface of the cone CU with the collision determination line segment Ld. According to such a configuration, it is possible to determine the existence ranges φL and φU of the arm angle for each of the cone CL and the cone CU by the simple geometrical method. It is therefore possible to determine the collision avoidance range of the robot arm 120 much faster.

Further, in this embodiment, the optimal arm angle φ$_0$ may be determined in advance and the target arm angle φt may be determined using the optimal arm angle φ$_0$. It is therefore possible to control the robot arm so that the posture of the robot arm becomes closer to the reference posture of the robot arm while avoiding the collision of the robot arm. It is therefore possible to control the robot arm so that the operation of the robot arm becomes more natural while avoiding collision of the robot arm.

Second Embodiment

Next, a second embodiment will be described. In the first embodiment, the torso 110 is shown as the cuboid. The second embodiment is different from the first embodiment in that a corner part of the torso 110 is shown as a curved surface in the second embodiment. Hereinafter, with reference to the drawings, the first embodiment and the second embodiment will be compared.

Figure 15:
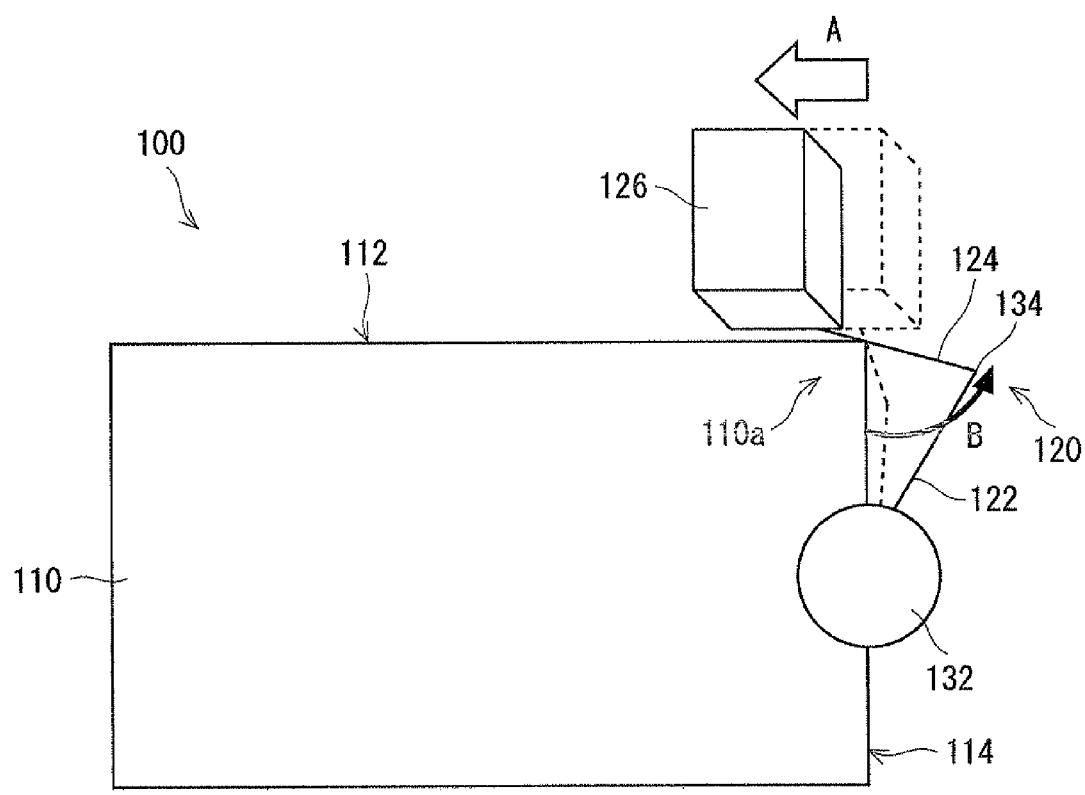
FIG. 15 is a top view showing a motion of the robot arm when a target hand position is in the vicinity of a corner part of the torso according to the first embodiment.
Figure 16:
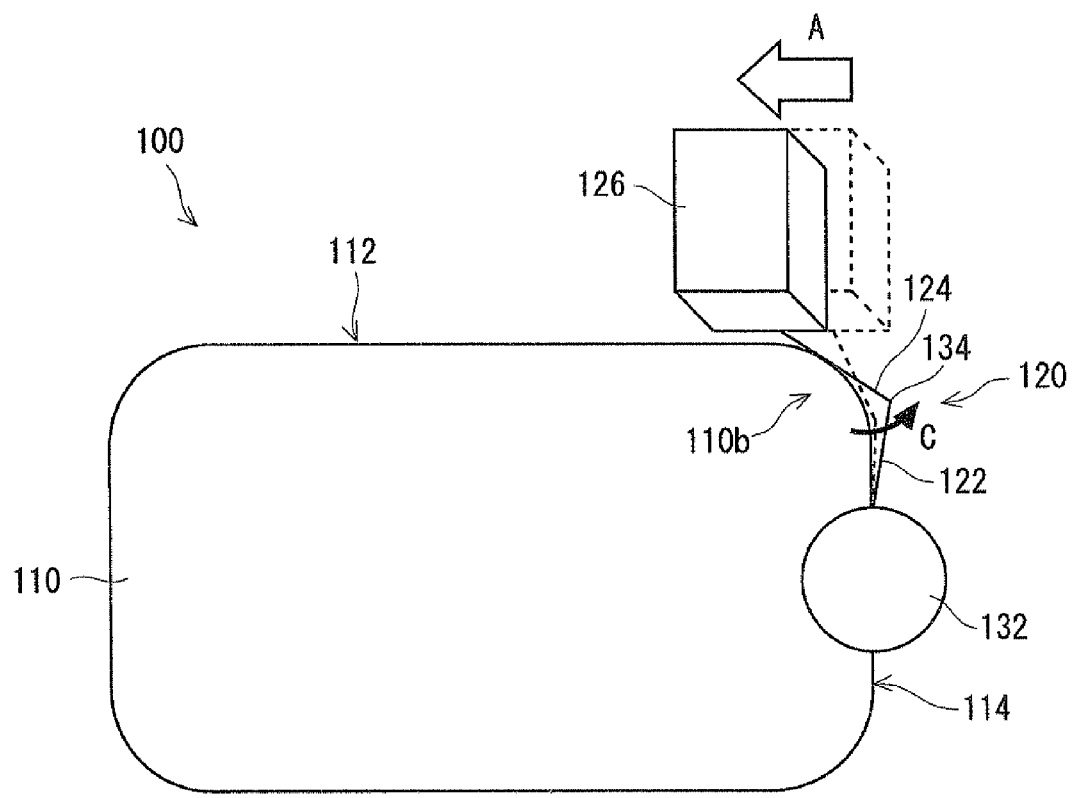
FIG. 16 is a top view showing a motion of a robot arm when a target hand position is in the vicinity of a corner part of a torso according to a second embodiment.

FIG. 15 is a top view showing the motion of the robot arm 120 when the target hand position is in the vicinity of a corner part 110a of the torso 110 according to the first embodiment. Further, FIG. 16 is a top view showing the motion of the robot arm 120 when the target hand position is in the vicinity of a corner part 110b of the torso 110 according to the second embodiment. In FIGS. 15 and 16, the upper side of the robot 100, which means the robot 100 seen from the positive direction of the z axis, is shown.

As described above, since the torso 110 is shown as the cuboid in the first embodiment, the corner part 110a is formed of, for example, two planes that cross at about 90 degrees. In such a case, when the hand part 126 is slightly moved to the side of the center of the torso 110 in the direction of the arrow A in the vicinity of the corner part 110a, the robot arm 120 greatly moves as shown in the arrow B in order to avoid the collision against the torso 110. In other words, in the first embodiment, only a slight movement of the hand part 126 may cause a sharp movement of the robot arm 120. As described above, when the robot arm 120 sharply moves, each joint of the robot arm 120 is sharply operated. As a result, overspeed and overload may occur in a motor (not shown) of each joint, which may cause each joint to be degraded.

On the other hand, in the second embodiment, the corner part 110b of the torso 110 is formed into a curved surface. Therefore, as shown in FIG. 16, when the hand part 126 is moved in the direction of the arrow A by the amount of change shown in FIG. 15, the amount of change of the motion of the robot arm 120 is reduced as shown by the arrow C. It is therefore possible to suppress overspeed and overload in the motor of each joint of the robot arm 120.

Figure 17:
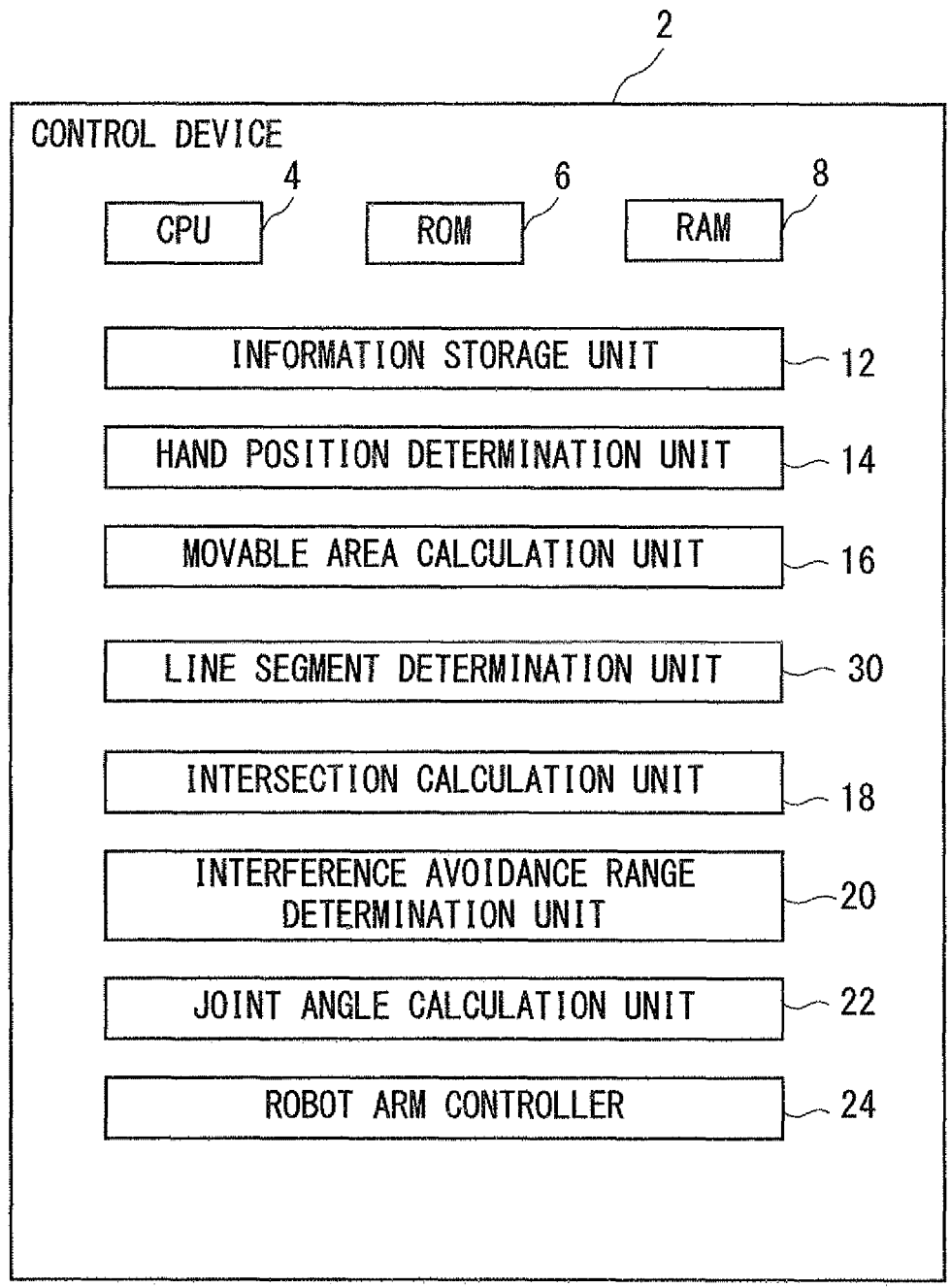
FIG. 17 is a functional block diagram showing a configuration of a control device according to the second embodiment.

FIG. 17 is a functional block diagram showing a configuration of the control device 2 according to the second embodiment. The hardware configuration of the control device 2 according to the second embodiment is substantially similar to the hardware configuration of the control device 2 according to the first embodiment. On the other hand, the control device 2 according to the second embodiment is different from that of the first embodiment in that the control device 2 according to the second embodiment further includes a line segment determination unit 30 in addition to the components of the control device 2 according to the first embodiment.

The line segment determination unit 30 determines the collision determination line segment Ld. That is, the line segment determination unit 30 has a function as line segment determination means that determines the collision determination line segment Ld. In the first embodiment, the collision determination line segment Ld is constantly the line segment AB. In other words, in the first embodiment, the collision determination line segment Ld does not vary regardless of the position of the hand part 126. On the other hand, in the second embodiment, as will be described below, the collision determination line segment Ld varies depending on the position of the hand part 126. The line segment determination unit 30 determines the collision determination line segment Ld depending on the position of the hand part 126 (e.g., every time the position of the hand part 126 is specified). As described above, by determining the collision determination line segment Ld according to the position of the hand part 126, even when the corner part 110b is formed of a curved surface, the collision avoidance range may be easily determined by the simple geometrical method using the method similar to that in the first embodiment.

Figure 18:
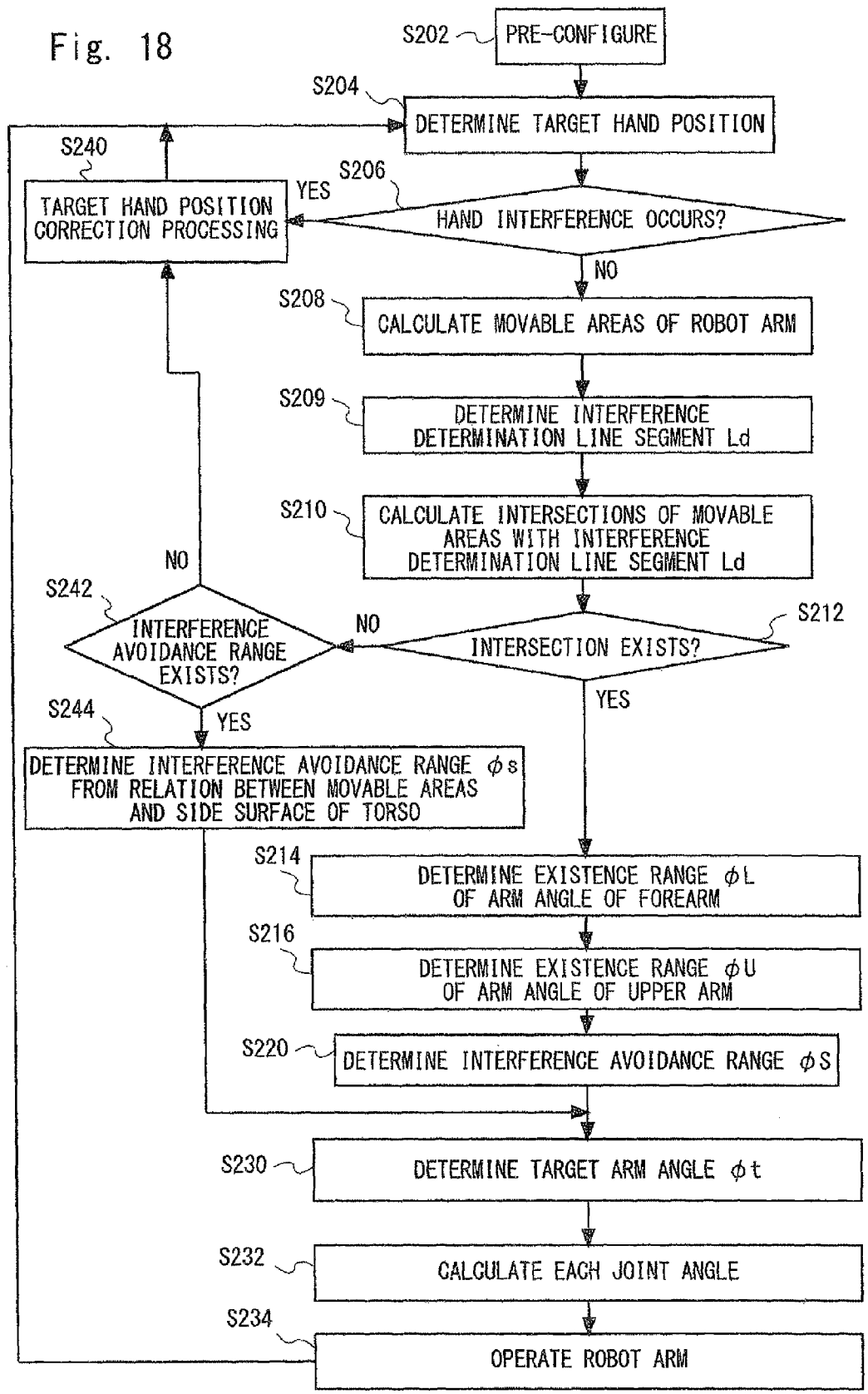
FIG. 18 is a flowchart showing processing of the control device according to the second embodiment.

FIG. 18 is a flowchart showing processing of the control device 2 according to the second embodiment. In FIG. 18, Step S209 is added to each processing of FIG. 4. As shown in FIG. 18, in the second embodiment as well, the control device 2 performs processing S202 to S208 substantially similar to S102 to S108 shown in FIG. 4. Therefore, the descriptions of S202 to S208 will be omitted.

In Step S209, the control device 2 determines the collision determination line segment Ld. Specifically, the line segment determination unit 30 of the control device 2 determines the collision determination line segment Ld for each of the cone CL (trajectory of the forearm part 124) and the cone CU (trajectory of the upper arm part 122) according to the position of the hand part 126 (target hand position). The line segment determination unit 30 determines the line that includes the contact point in the tangent line that passes the position of the hand part 126 and contacts the curved surface in the corner part 110b as a collision determination line segment $Ld_L$ for the cone CL. Further, the line segment determination unit 30 determines the line that includes the contact point in the tangent line that passes the position of the shoulder part 132 and contacts the curved surface in the corner part 110b as a collision determination line segment $Ld_U$ for the cone CU. In the following description, this processing will be specifically described.

Figure 19:
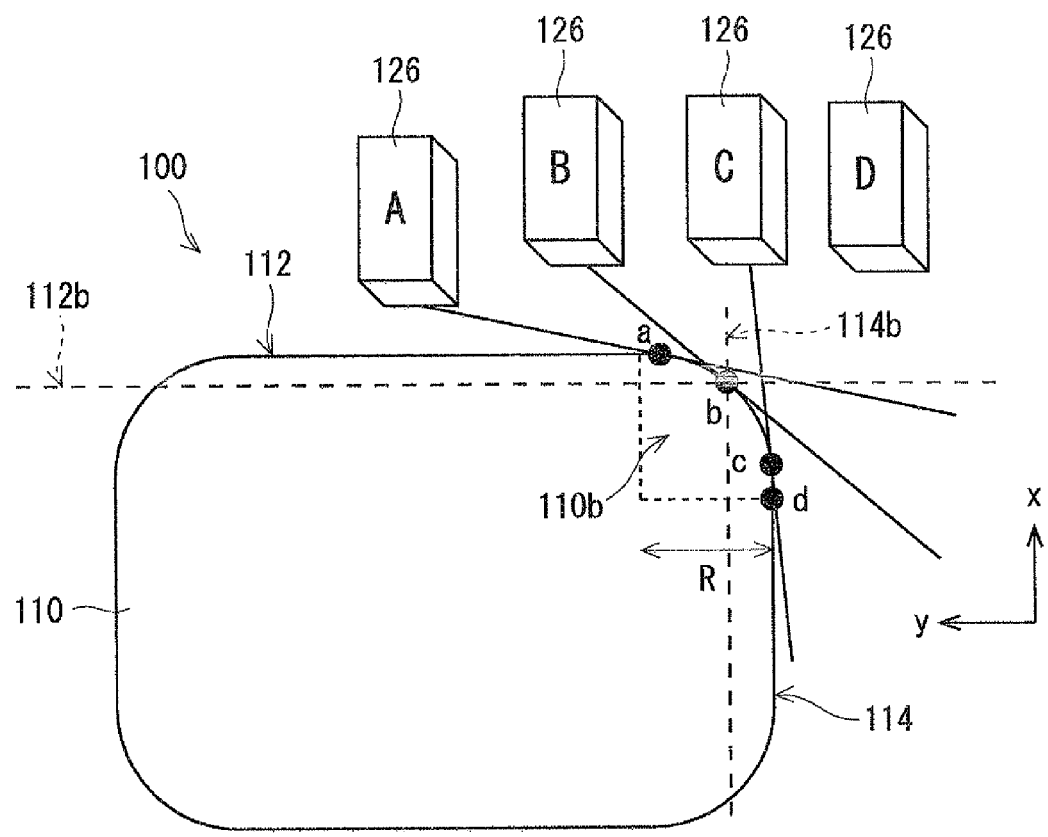
FIG. 19 is a diagram for describing a method of determining a collision determination line segment in a cone CL (trajectory of a forearm part) according to the second embodiment.

FIG. 19 is a diagram for describing the method of determining the collision determination line segment $Ld_L$ for the cone CL (the trajectory of the forearm part 124) according to the second embodiment. In FIG. 19, the corner part 110b is a curved surface formed of an arc having a radius R. The line segment determination unit 30 determines, when the hand part 126 is in a position A, the line that passes a contact point a of the tangent line drawn from the position A to the curved surface in the corner part 110b and is parallel to the z axis as the collision determination line segment $Ld_L$. In a similar way, the line segment determination unit 30 determines, when the hand part 126 is in a position B (or a position C), the line that passes a contact point b (or a contact point c) of the tangent line drawn from the position B (or the position C) to the curved surface in the corner part 110b and is parallel to the z axis as the collision determination line segment $Ld_L$. When the hand part 126 is in a position D, it is impossible to draw the tangent line from the position D to the curved surface in the corner part 110b. In such a case, the line segment determination unit 30 determines the line that passes an end point d of the curved surface in the corner part 110b and is parallel to the z axis as the collision determination line segment $Ld_L$.

Figure 20:
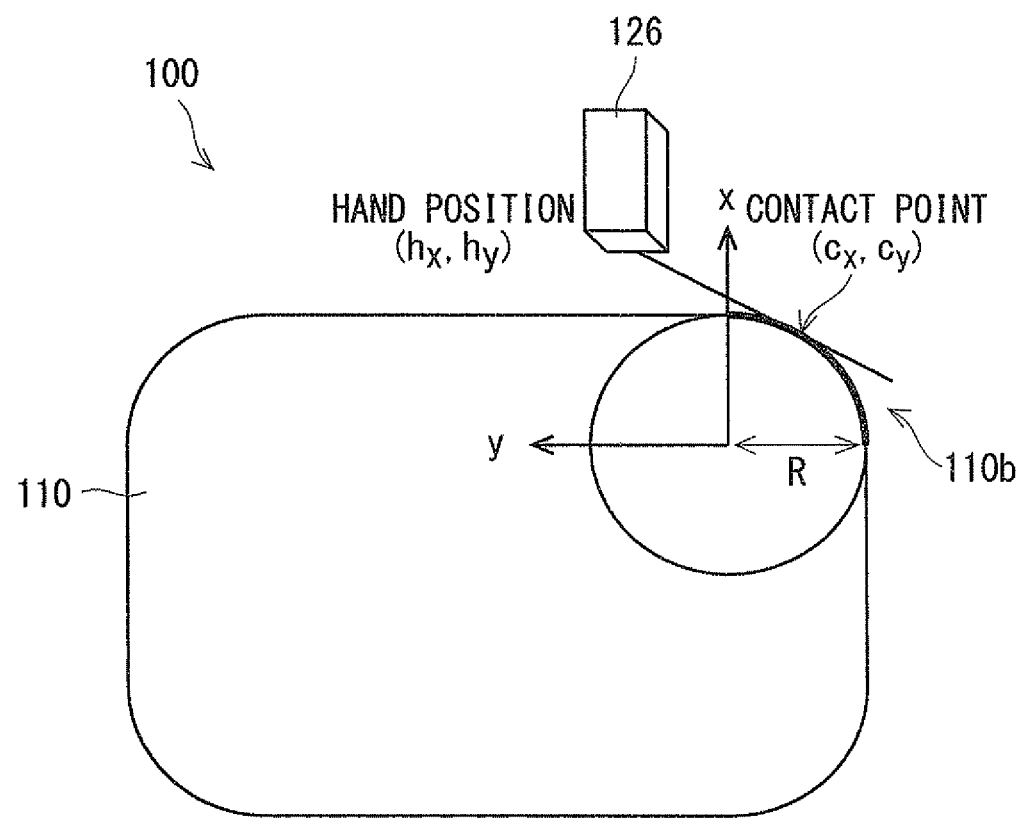
FIG. 20 is a diagram for describing a method of determining a contact point according to the second embodiment.

FIG. 20 is a diagram for describing a method of determining the contact point according to the second embodiment. When the contact point is determined, the z axis components are ignored. Further, the center of the arc forming the curved surface in the corner part 110b is the origin, the front direction of the torso 110 (upper direction of the paper surface in FIG. 20) is the x axis positive direction, and the left direction of the torso 110 (left direction of the paper surface in FIG. 20) is the y axis positive direction. It is assumed in such a coordinate system that the position of the hand part 126 has been determined to be $(h_x, h_y)$. At this time, the line segment determination unit 30 determines a contact point $(c_x, c_y)$ as shown below.

Since the contact point $(c_x, c_y)$ is on the circumference of the circle with the radius R, the line segment determination unit 30 obtains the following Expression 19.

$$c_x^2 + c_y^2 = R^2 \qquad \text{(Expression 19)}$$

Further, the line segment determination unit 30 calculates the equation indicating the tangent line as shown in the following Expression 20.

$$c_x x + c_y y = R^2 \qquad \text{(Expression 20)}$$

Since the tangent line passes the hand position $(h_x, h_y)$, the line segment determination unit 30 assigns $(h_x, h_y)$ into Expression 20 to obtain the following Expression 21.

$$c_x h_x + c_y h_y = R^2 \qquad \text{(Expression 21)}$$
$$\therefore c_y = \frac{R^2 - c_x h_x}{h_y}$$

Further, the line segment determination unit 30 solves the quadratic equation of $c_x$ obtained by assigning $c_y$ obtained in Expression 21 into Expression 19 to calculate $c_x$. Further, the line segment determination unit 30 assigns the obtained $c_x$ into Expression 20 to calculate $c_y$. Accordingly, the line segment determination unit 30 determines the contact point $(c_x, c_y)$. While a plurality of contact points are obtained, the line segment determination unit 30 determines the contact point which is in a thick line part of FIG. 20 ($x \geq 0, y \leq 0$) as the contact point $(c_x, c_y)$. The origin of the xyz coordinate system is actually the position of the shoulder part 132. Therefore, the line segment determination unit 30 carries out coordinate conversion to convert the origin position for the contact point $(c_x, c_y)$ that has been calculated.

Figure 21:
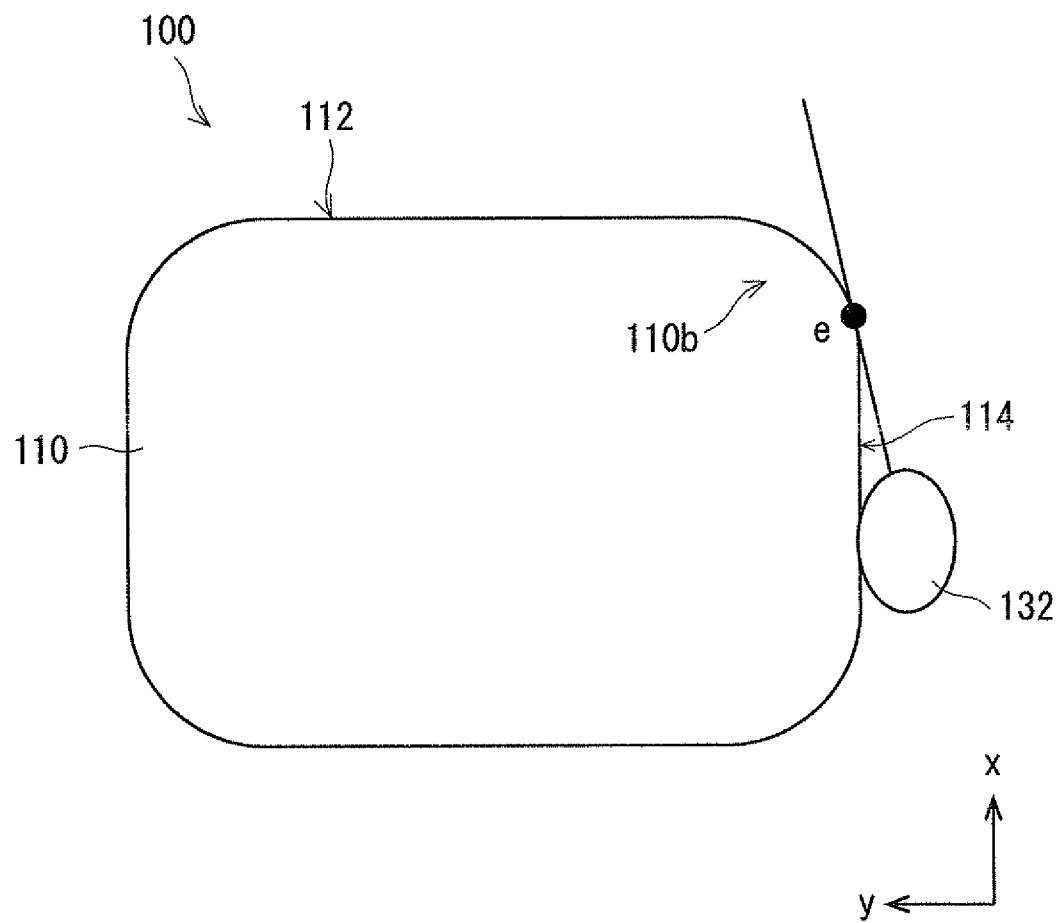
FIG. 21 is a diagram for describing a method of determining the collision determination line segment in a cone CU (trajectory of an upper arm part) according to the second embodiment.

FIG. 21 is a diagram for describing a method of determining the collision determination line segment $Ld_U$ for the cone CU (trajectory of the upper arm part 122) according to the second embodiment. The line segment determination unit 30 determines the line that passes a contact point e of the tangent line drawn from the shoulder part 132 to the curved surface in the corner part 110b and is parallel to the z axis as the collision determination line segment $Ld_U$. The position of the shoulder part 132 is constant regardless of the position of the hand part 126. Therefore, the line segment determination unit 30 may determine the collision determination line segment $Ld_U$ in advance before the position of the hand part 126 is specified.

In Step S210, the intersection calculation unit 18 of the control device 2 calculates the intersections of the cones shown in FIGS. 7A and 7B with the collision determination line segment Ld, similar to S110 shown in FIG. 4. At this time, the intersection calculation unit 18 calculates the intersection of the collision determination line segment $Ld_L$ calculated by the line segment determination unit 30 with the cone CL. Similarly, the intersection calculation unit 18 calculates the intersection of the collision determination line segment $Ld_U$ calculated by the line segment determination unit 30 with the cone CU. Since the other processing is similar to that of S110, the descriptions thereof will be omitted.

As shown in FIG. 18, in the second embodiment as well, the control device 2 performs processing S212 to S234 and S240 to S244 substantially similar to the processing of S112 to S134 and S140 to S144 shown in FIG. 4. Therefore, the descriptions of S212 to S234 and S240 to S244 will be omitted.

In S214, in the method of determining the existence range $\phi L$ of the arm angle described with reference to FIG. 10, the plane obtained by converting the coordinates of the plane that is parallel to the torso front surface 112 and passes the contact point is used in place of the plane F'. Similarly, the plane obtained by converting the coordinates of the plane that is parallel to the torso side surface 114 and passes the contact point is used in place of the plane S'. When the contact point is determined as the contact point b in FIG. 19, for example, the plane obtained by converting the coordinates of a plane 112b that is parallel to the torso front surface 112 and passes the contact point b is used in place of the plane F'. Similarly, the plane obtained by converting the coordinates of a plane 114b that is parallel to the torso side surface 114 and passes the contact point b is used in place of the plane S'.

Further, in S214, in the method of determining the arm angle $\phi$ described with reference to FIG. 12, the plane obtained by converting the coordinates of the plane that is parallel to the torso front surface 112 and passes the contact point is used in place of the plane F'. When the contact point is determined as the contact point b in FIG. 19, for example, the plane obtained by converting the coordinates of the plane 112b that is parallel to the torso front surface 112 and passes the contact point b is used in place of the plane F'.

Further, in S216, in the method of determining the existence range $\phi L$ of the arm angle described with reference to FIG. 10, the plane obtained by converting the coordinates of the plane that is parallel to the torso front surface 112 and passes the contact point e is used in place of the plane F'. Similarly, the plane obtained by converting the coordinates of the plane that is parallel to the torso side surface 114 and passes the contact point e is used in place of the plane S'. Further, in S216, in the method of determining the arm angle $\phi$ with reference to FIG. 12 as well, the plane obtained by converting the coordinates of the plane that is parallel to the torso side surface 114 and passes the contact point e is used in place of the plane S'.

Figure 22:
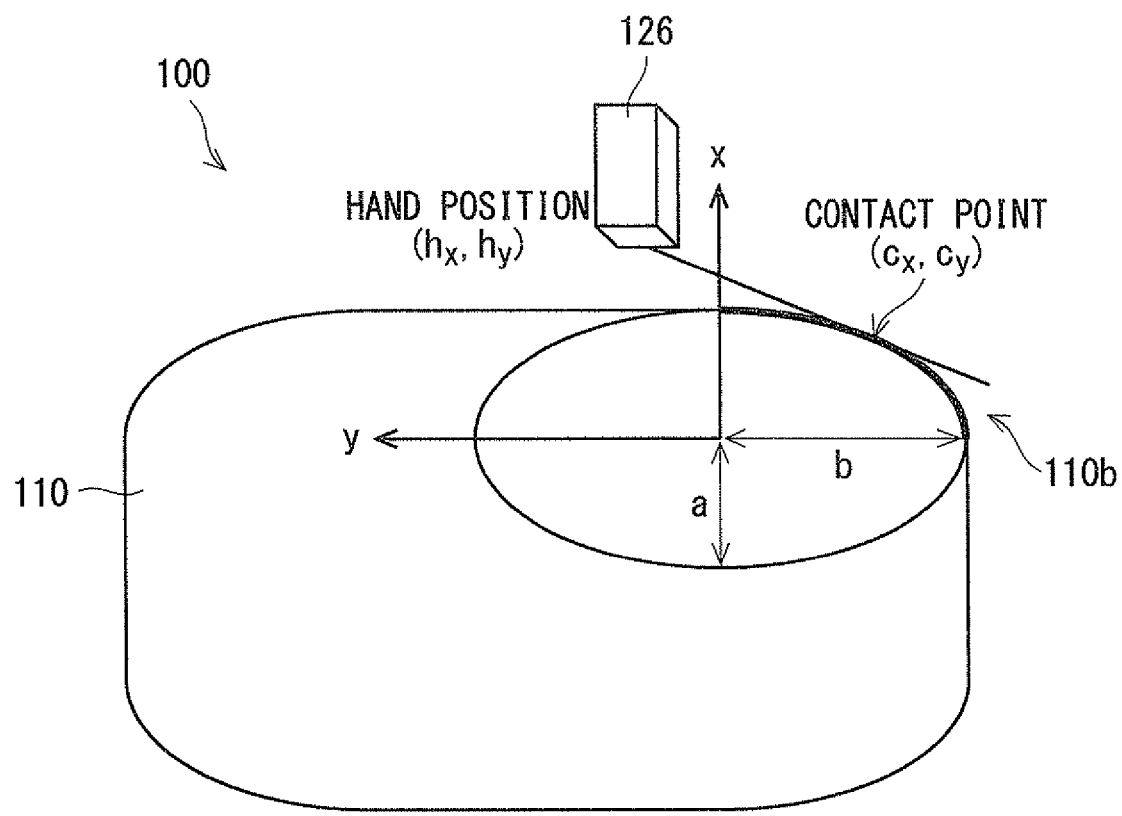
FIG. 22 is a diagram for describing another method of determining the contact point according to the second embodiment.

FIG. 22 is a diagram for describing another method of determining the contact point according to the second embodiment. FIG. 22 shows a case in which the curved surface in the corner part 110b is an arc of an ellipse, unlike the case shown in FIG. 20. When the contact point is determined, the z axis components are ignored. Further, the center of the arc of the ellipse forming the curved surface in the corner part 110b is the origin, the front direction of the torso 110 is the x axis positive direction, and the left direction of the torso 110 is the y axis positive direction. It is assumed here that the axis in the x axis direction of the ellipse is represented by 2a and the axis in the y axis direction is represented by 2b. It is assumed in such a coordinate system that the position of the hand part 126 is determined to be $(h_x, h_y)$. At this time, the line segment determination unit 30 determines the contact point $(c_x, c_y)$ as shown below.

Since the contact point $(c_x, c_y)$ is on the circumference of the ellipse, the line segment determination unit 30 obtains the following Expression 22.

$$\frac{c_x^2}{a^2} + \frac{c_y^2}{b^2} = 1 \qquad \text{(Expression 22)}$$

Further, the line segment determination unit 30 calculates the equation indicating the tangent line as shown in the following Expression 23.

$$\frac{c_x x}{a^2} + \frac{c_y y}{b^2} = 1 \quad \text{(Expression 23)}$$

Since the tangent line passes the hand position ($h_x, h_y$), the line segment determination unit 30 assigns ($h_x, h_y$) into Expression 23 to obtain the following Expression 24.

$$\frac{c_x h_x}{a^2} + \frac{c_y h_y}{b^2} = 1 \quad \text{(Expression 24)}$$

$$\therefore c_y = \frac{R^2}{h_y} - \frac{c_x h_x b^2}{a^2 h_y}$$

Further, the line segment determination unit 30 solves the quadratic equation of $c_x$ obtained by assigning $c_y$ obtained in Expression 24 into Expression 22 to calculate $c_x$. Further, the line segment determination unit 30 assigns $c_x$ that has been calculated into Expression 23 to calculate $c_y$. The line segment determination unit 30 thus determines the contact point ($c_x, c_y$). While a plurality of contact points are obtained, the line segment determination unit 30 determines the contact point in a thick line part ($x \geq 0, y \leq 0$) of FIG. 22 as the contact point ($c_x, c_y$). Since the origin of the xyz coordinate system is actually the position of the shoulder part 132, the line segment determination unit 30 carries out coordinate conversion to change the origin position of the contact point ($c_x, c_y$) that has been calculated.

While only the corner part 110b is formed into a curved surface in the second embodiment, the present invention is not limited to such a configuration. For example, the whole circumference of the torso 110 may be formed into a curved surface. In such a case, the plane parts of the torso front surface 112 and the torso side surface 114 may be simply eliminated in the second embodiment. In other words, besides the corner part 110b, all the torso front surface 112 and the torso side surface 114 may be expressed by curved surfaces.

Figure 23:
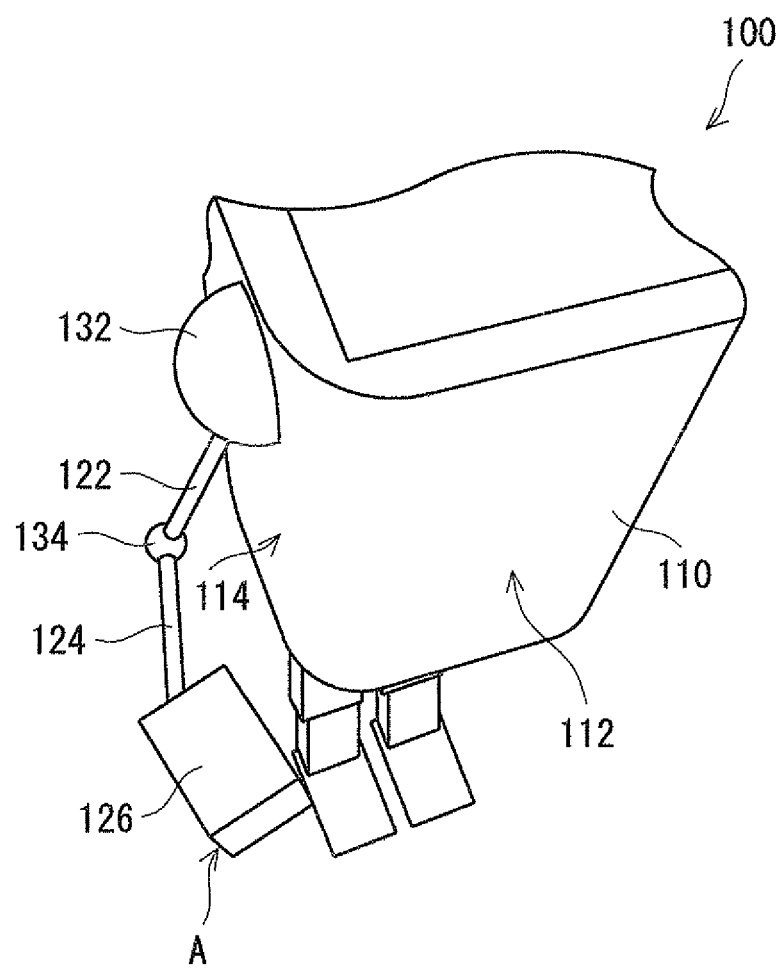
FIGS. 23 to 26 are diagrams showing results of simulations in which operations of the robot that employs this embodiment are reproduced.
Figure 24:
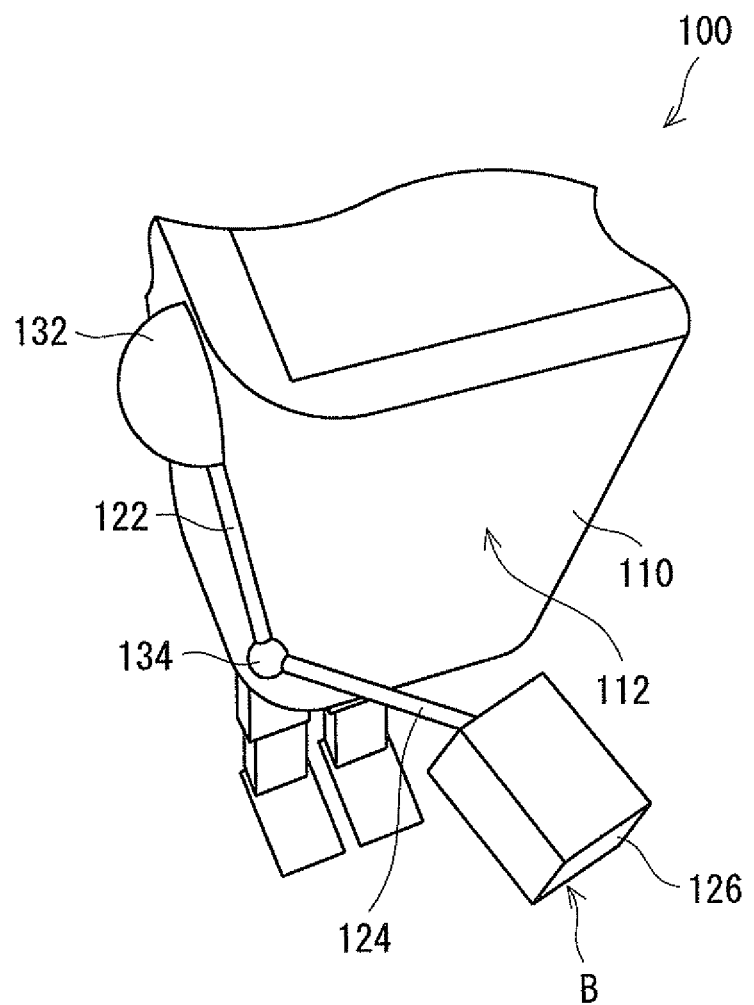
Figure 25:
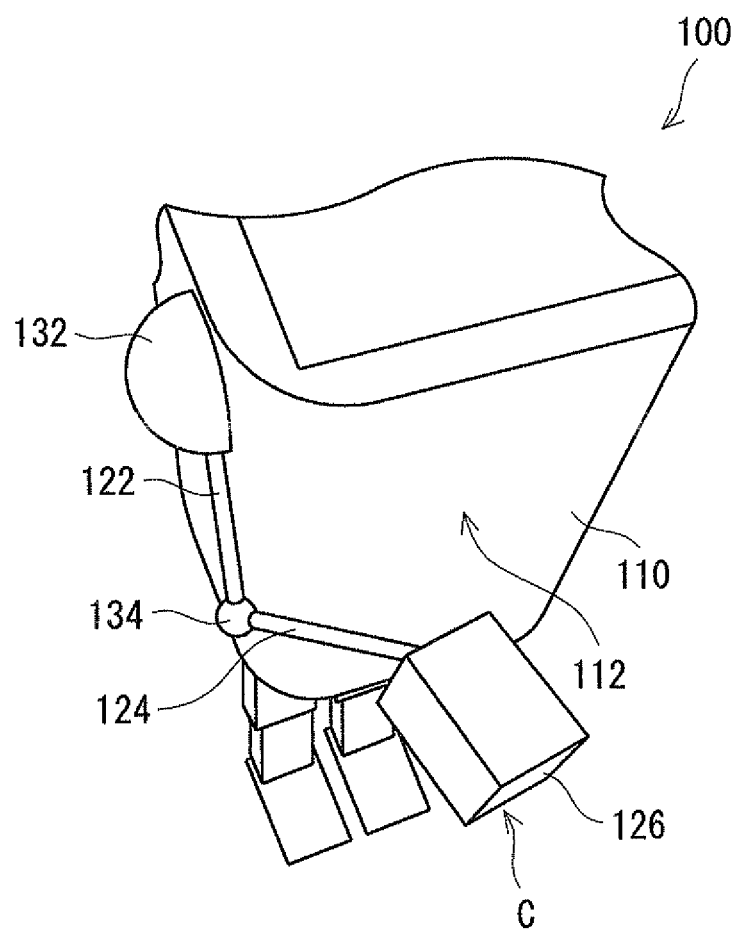
Figure 26:
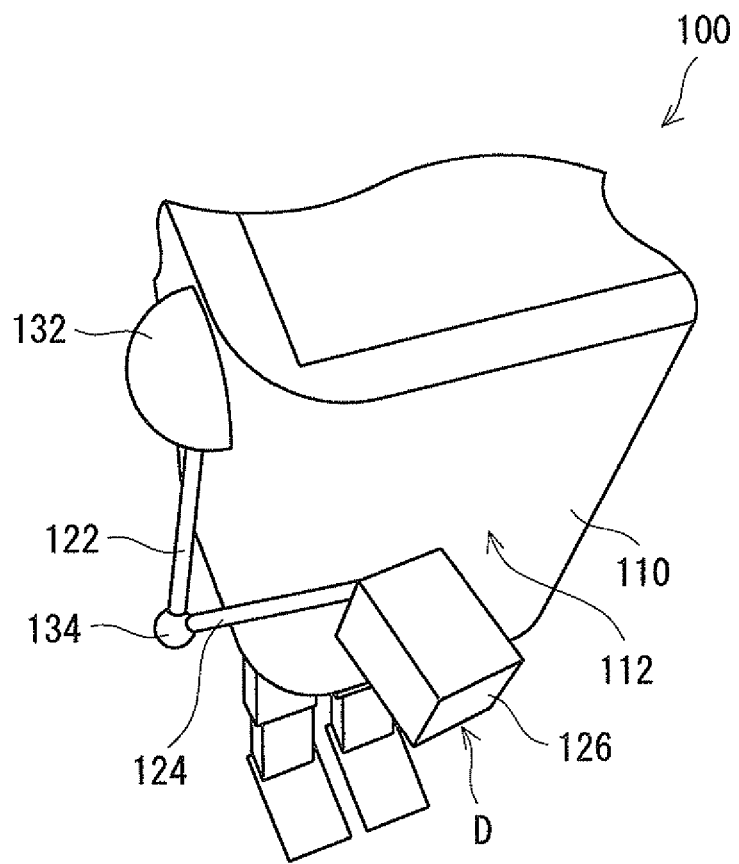

FIGS. 23 to 26 are diagrams showing results of simulations in which operations of the robot 100 that employs this embodiment are reproduced. First, as shown in FIG. 23, the position of the hand part 126 is specified to be a position A which is in the outside of the torso side surface 114 by an operation by the operator. Next, as shown in FIG. 24, by an operation by the operator, the position of the hand part 126 is specified to be a position B, which is the front side of the torso front surface 112. Next, as shown in FIG. 25, the position of the hand part 126 is specified to be a position C, which is closer to the torso front surface 112 than the position B by an operation by the operator. Further, as shown in FIG. 26, the position of the hand part 126 is specified to be a position D, which is closer to the torso front surface 112 than the position C by an operation by the operator. No matter which position of the positions A to D the position of the hand part 126 is specified, the upper arm part 122 and the forearm part 124 operate not to collide against the torso 110. Further, since the corner part 110b of the torso 110 of the robot 100 is formed into a curved surface, the motion of the robot arm 120 (especially the movement of the elbow part 134) becomes smooth (that is, not sharp) in the series of operations shown in FIGS. 23 to 26.

Varied Examples

Note that the present invention is not limited to the above embodiments and may be changed as appropriate without departing from the spirit of the present invention. For example, in the flowcharts shown in FIGS. 4 and 18, the order of the processing can be changed as appropriate. For example, in FIG. 4, the processing of S102 to S106 and S140 to S144 may be omitted. Further, the order of the processing S114 and S116 may be reversed. Further, in FIG. 18, the processing of S208 and the processing of S209 may be replaced with each other.

Further, while the torso 110 of the robot 100 has been described as the example of the obstacle in the above embodiments, the obstacle may not be the torso of the robot 100. For example, the obstacle may be an arbitrary object such as a column or a wall that the robot arm 120 may collide. In this case, the control device 2 may include means for acquiring data indicating the position of each obstacle. For example, the robot 100 may include a sensor to acquire positional data (coordinate data) of the obstacle. Further, the number of obstacles is not limited to one and may be a plural number. In this case, the above processing may be performed for each of the plurality of obstacles. At this time, the collision avoidance range is determined for each of the plurality of obstacles. The range in which the plurality of collision avoidance ranges that have been determined overlap with each other may be determined as the collision avoidance range in which the robot arm does not collide against the plurality of obstacles.

Further, the order of the first joint part 141, the second joint part 142, and the third joint part 143 and the order of the fifth joint part 145, the sixth joint part 146, and the seventh joint part 147 are not limited to the orders shown in FIG. 1 and may be changed as appropriate. When the order of each joint has been changed, the calculation method in the joint angle calculation unit 22 may be changed as appropriate.

Further, while the collision determination line segment Ld is in the corner part 110a or the corner part 110b of the torso 110 in the above embodiments, the present invention is not limited to such a configuration. The collision determination line segment Ld may be an arbitrary line segment on the surface (boundary surface) of the torso 110 (obstacle). However, when the collision determination line segment Ld is the line segment in the corner part 110a or the corner part 110b, it becomes much easier to determine the collision avoidance range.

Further, while the collision of the robot arm 120 with the obstacle (torso or the like) has been described in the above embodiments, the robot arm 120 is not limited to the arm of the robot. For example, the robot arm according to this embodiment may be applied to a leg of the robot. In this case, the upper arm part may be replaced by a thigh part, the forearm part may be replaced by a shank part, and the elbow may be replaced by a knee. Further, the robot arm according to this embodiment may also be applied to an arbitrary manipulator.

Further, while the robot arm 120 (and the robot 100) is provided in the physically substantial robot 100 in the above embodiments, the present invention is not limited to such a configuration. For example, the robot arm 120 (and the robot 100) may be a virtual one. That is, this embodiment can be applied to a virtual reality system, for example. Specifically, this embodiment may also be applied to a calculation to avoid collision of an arbitrary virtual link-shaped object with an arbitrary virtual obstacle in a video-game, for example.

Further, this embodiment may be applied to simulate whether there is a collision of an arbitrary link-shaped object with the obstacle.

Further, the xyz coordinate system has been defined as shown in FIG. 1 in the above embodiments, how to define the xyz coordinate system for the robot arm 120 can be changed as appropriate. The same is true for the x'y'z' coordinate system. Further, while the calculation has been performed assuming that the position of the hand part 126 is the same as the position of the wrist part 136 in the above embodiments, these positions may be different from each other. In this case, when the hand position is specified, the offset (difference) between the hand part 126 and the wrist part 136 may be taken into consideration for the hand position that has been defined. Further, while the shoulder part 132 has been set as the origin of the xyz coordinate system in the above embodiments, the position of the origin may be a desired position. In this case, the calculation may be performed in consideration of the offset between the shoulder part 132 and the origin.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A collision avoidance method of a robot arm that avoids collision of the robot arm with an obstacle, the robot arm including a first arm and a second arm connected to each other via a joint part, the method comprising:
    calculating, as movable areas of the first arm and the second arm, trajectories drawn by the first arm and the second arm in an XYZ coordinate system when the first arm and the second arm are rotated in a state in which positions of both a first end and a second end of the robot arm have been fixed;
    calculating intersections that are points, in the XYZ coordinate system, in which the movable areas and a first line intersect, wherein the first line is set on a boundary surface of an obstacle area that is coordinate data including positions of the obstacle, and wherein the first line is used for determining a collision of the robot arm with the obstacle; and
    determining boundary angles of an arm angle of the robot arm based on the intersections that have been calculated, and determining, when the movable areas are separated by the boundary angles, a side of the separated movable areas which does not collide against the obstacle area, as a collision avoidance range in which the robot arm does not collide against the obstacle area in the movable areas.

2. The collision avoidance method according to claim 1, wherein:
    the movable areas are formed of cones having a circle formed by a trajectory obtained by rotating the joint part in a state in which the positions of both of the ends of the robot arm have been fixed as a bottom surface and having rotational surfaces formed by the trajectories obtained by rotating the first arm and the second arm as cone side surfaces, and
    the intersections are calculated separately for a first cone formed by the trajectory of the second arm and a second cone formed by the trajectory of the first arm.

3. The collision avoidance method according to claim 2, comprising, when an intersection of at least one of the movable areas with the first line is on the bottom surface, determining a range in which a first range, in which the second arm is determined not to collide with the obstacle area based on the first cone, and a second range, in which the first arm is determined not to collide with the obstacle area based on the second cone, overlap with each other as the collision avoidance range of the robot arm.

4. The collision avoidance method according to claim 3, comprising determining the first range based on the intersection on the cone side surface and the intersection on the bottom surface regarding the first cone and determining the second range based on the intersection on the cone side surface and the intersection on the bottom surface regarding the second cone.

5. The collision avoidance method according to claim 1, wherein at least a part of the boundary surface of the obstacle area is formed into a curved surface.

6. The collision avoidance method according to claim 5, comprising determining a line including a contact point in a tangent line, that passes a hand position of the robot arm, contacting the curved surface, and corresponds to the first line on the curved surface, wherein the contact point is a point in which the tangent line contacts the curved surface, and
    calculating the intersections that are points in which the movable areas and the determined line intersect.

7. A control device that controls a robot arm including a first arm and a second arm connected to each other via a joint part, the control device comprising:
    a movable area calculation unit that calculates, as movable areas of the first arm and the second, trajectories drawn by the first arm and the second arm in an XYZ coordinate system when the first arm and the second arm are rotated in a state in which positions of both a first end and a second end of the robot arm have been fixed;
    an intersection calculation unit that calculates intersections that are points, in the XYZ coordinate system, in which the movable areas and a first line intersect, wherein the first line is set on a boundary surface of an obstacle area that is coordinate data including positions of an obstacle, and wherein the first line is used for determining a collision of the robot arm with the obstacle; and
    a collision avoidance range determination unit that determines boundary angles of an arm angle of the robot arm based on the intersections that have been calculated, and determines, when the movable areas are separated by the boundary angles, a side of the separated movable areas which does not collide against the obstacle area, as a collision avoidance range in which the robot arm does not collide against the obstacle area in the movable areas.

8. A non-transitory computer readable medium storing a program for achieving a collision avoidance method of a robot arm that avoids collision of the robot arm with an obstacle, the robot arm including a first arm and a second arm connected to each other via a joint part, the program causing a computer to execute the following steps of:
    calculating, as movable areas of the first arm and the second arm, trajectories drawn by the first arm and the second arm in an XYZ coordinate system when the first and second arm are rotated in a state in which positions of both a first end and a second end of the robot arm have been fixed;
    calculating intersections that are points, in the XYZ coordinate system, in which the movable areas and a first line intersect, wherein the first line is set on a boundary surface of an obstacle area that is coordinate data including positions of the obstacle, and wherein the first line is used for determining a collision of the robot arm with the obstacle; and
determining boundary angles of an arm angle of the robot arm based on the intersections that have been calculated, and determining, when the movable areas are separated by the boundary angles, a side of the separated movable areas which does not collide against the obstacle area, as a collision avoidance range in which the robot arm does not collide against the obstacle area in the movable areas.

* * * * *